(12) United States Patent
Koyama

(10) Patent No.: US 8,233,227 B2
(45) Date of Patent: Jul. 31, 2012

(54) PRISM UNIT AND A PROJECTION IMAGE DISPLAY APPARATUS

(75) Inventor: Takehiro Koyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 665 days.

(21) Appl. No.: 12/325,408

(22) Filed: Dec. 1, 2008

(65) Prior Publication Data

US 2009/0141360 A1 Jun. 4, 2009

(30) Foreign Application Priority Data

Dec. 3, 2007 (JP) .................................. 2007-312008

(51) Int. Cl.
*G03B 21/00* (2006.01)

(52) U.S. Cl. ....................................................... 359/834

(58) Field of Classification Search .................. 359/831, 359/833–834
See application file for complete search history.

(56) References Cited

U.S. PATENT DOCUMENTS

| 5,084,123 | A | 1/1992 | Curtis |
|---|---|---|---|
| 7,147,333 | B2 | 12/2006 | Shirota |
| 2002/0036819 | A1 | 3/2002 | Watanabe |
| 2005/0001985 | A1 | 1/2005 | Kitabayashi |
| 2005/0162621 | A1 | 7/2005 | Shirota |
| 2007/0229770 | A1 | 10/2007 | Miyata et al. |
| 2009/0141360 | A1* | 6/2009 | Koyama .................. 359/618 |

FOREIGN PATENT DOCUMENTS

| JP | 2000-131583 A | 5/2000 |
|---|---|---|
| JP | 2005-208318 A | 8/2005 |
| JP | 2007-219160 A | 8/2007 |
| JP | 2007-226913 A | 9/2007 |
| WO | 2004/038481 A1 | 5/2004 |
| WO | 2005/054953 A2 | 6/2005 |

OTHER PUBLICATIONS

European Search Report issued on Mar. 11, 2009 for corresponding European Patent Application No. 08020874.7.
European Office Action issued Mar. 31, 2011.

* cited by examiner

*Primary Examiner* — Jennifer L. Doak
(74) *Attorney, Agent, or Firm* — Canon U.S.A., Inc. IP Division

(57) ABSTRACT

A prism unit includes a prism having at least one optical surface in its inside, and a prism base disposing the prism, the prism base including at least three seating surfaces that are attached to a surface orthogonal to the optical surface of the prism, a seating surface bonded part that is bonded to the prism by an adhesive. At least the three seating surfaces and the seating surface bonded part are symmetrically arranged on the optical surface of the prism.

8 Claims, 24 Drawing Sheets

PRISM UNIT AND A PROJECTION IMAGE DISPLAY APPARATUS

BACKGROUND OF THE INVENTION

1. Field of the Invention

The present invention relates to a prism unit that is used for a reflection-type projector apparatus or the like.

2. Description of the Related Art

Conventional reflective liquid crystal projectors which implement color separation and color composition with an optical system using a plurality of reflective liquid crystal panels for chromatic light generally comprise optical systems of the color separation or the color composition by using a polarized light beam splitter prism or dichroic prism. These optical systems use a plurality of prisms, and a relative positional relationship among the light incident prism surfaces directly influences the image quality, such as contrast deteriorations due to the prism's falls and positional shifts of pixels of each chromatic light, or a shift of the illumination optical axis to the liquid crystal panel.

Accordingly, a prism base used to constitute an integral prism unit by attaching the prisms needs to have a structure which can restrain relative positional changes of the prisms as much as possible. Usually, prisms are bonded and fixed onto the prism base by a UV-curing (ultra violate curing) adhesive, and then attached to a body (see Japanese Patent Laid-Open Nos. 2000-131583 and 2005-208318).

A glass, a metal or a resin may be used for the prism base that joins the prisms in manufacturing a prism unit which can precisely maintain the relative positional relationship among the prisms and have high reliability. Whatever is selected among the glass, metal and resin, if the prisms are bonded to the prism base made of a material different from that of the prism, an elastic deformation due to a difference in coefficient of linear expansion needs to be considered, and the adhesive which bonds the different materials absorbs the relative movements (see Japanese Patent Laid-Open No. 2000-131583).

If an ambient temperature changes due to the bonding condition of the prisms to the prism base, the orientation of the prism may change or the prism may break; when the orientation of the prism changes and the relative positional relationship changes, the optical performance may deteriorate. The ray's reflecting angle may change twice when a polarization beam splitter rotates in the plane perpendicular to the polarization separating surface. The deterioration of the optical performance may also occur when the prism falls in the seating surface direction because the optical axis falls concurrently.

BRIEF SUMMARY OF THE INVENTION

The present invention is directed to a prism unit which precisely joins prisms to a prism base by solving the above problems.

The present invention is also directed to a prism unit which controls a position of a seating surface to a prism optical surface, and prevents the deterioration of the optical performance even if the environmental conditions change.

The present invention is also directed to a prism unit that has a groove in a seating surface bonded part of the prism base which prevents an adhesion of the adhesive to the base.

A prism unit directed to the present invention includes a prism having at least one optical surface in its inside, and a prism base disposing the prism, the prism base including at least three seating surfaces that are attached to a surface orthogonal to the optical surface of the prism, a seating surface bonded part that is bonded to the prism by an adhesive. At least the three seating surfaces and the seating surface bonded part are symmetrically arranged on the optical surface of the prism.

A prism unit directed to the present invention further includes a prism having at least one optical surface in its inside, and a prism base disposing the prism, the prism base including at least three seating surfaces that are attached to a surface orthogonal to the optical surface of the prism, a seating surface bonded part that is bonded to the prism by an adhesive. A groove is formed between the seating surface and the seating surface bonded part.

The prism unit according to the present invention can precisely maintain a positional relationship among the prisms, high environmental reliability, and highly reliable adhesion by using a plurality of seating surfaces provided on the prism base in bonding the prisms to the prism base.

A revolution of the optical surface that would otherwise caused by the stress generated due to the difference in coefficient of linear expansion among the prisms and the prism base in its use environment can be minimized by controlling a position of the seating surface of the prism base to the prism's optical surface Further, the groove disposed among the seating surface of the prism base and the seating surface bonded part accepts a flow of the adhesive out of the seating surface and prevents it from reaching to the seating surface, preventing an accidental strong bonding of the seating surface. Further, when the groove is extended to the groove of the prism base, an extra adhesive which remains uncured can be absorbed.

Further features of the present invention will become apparent from the following description of exemplary embodiments (with reference to the attached drawings).

DESCRIPTION OF THE EMBODIMENTS

Referring now to the accompanying drawings, a description will be given of a preferred embodiment of the present invention.

[Embodiment 1]

Figure 1:
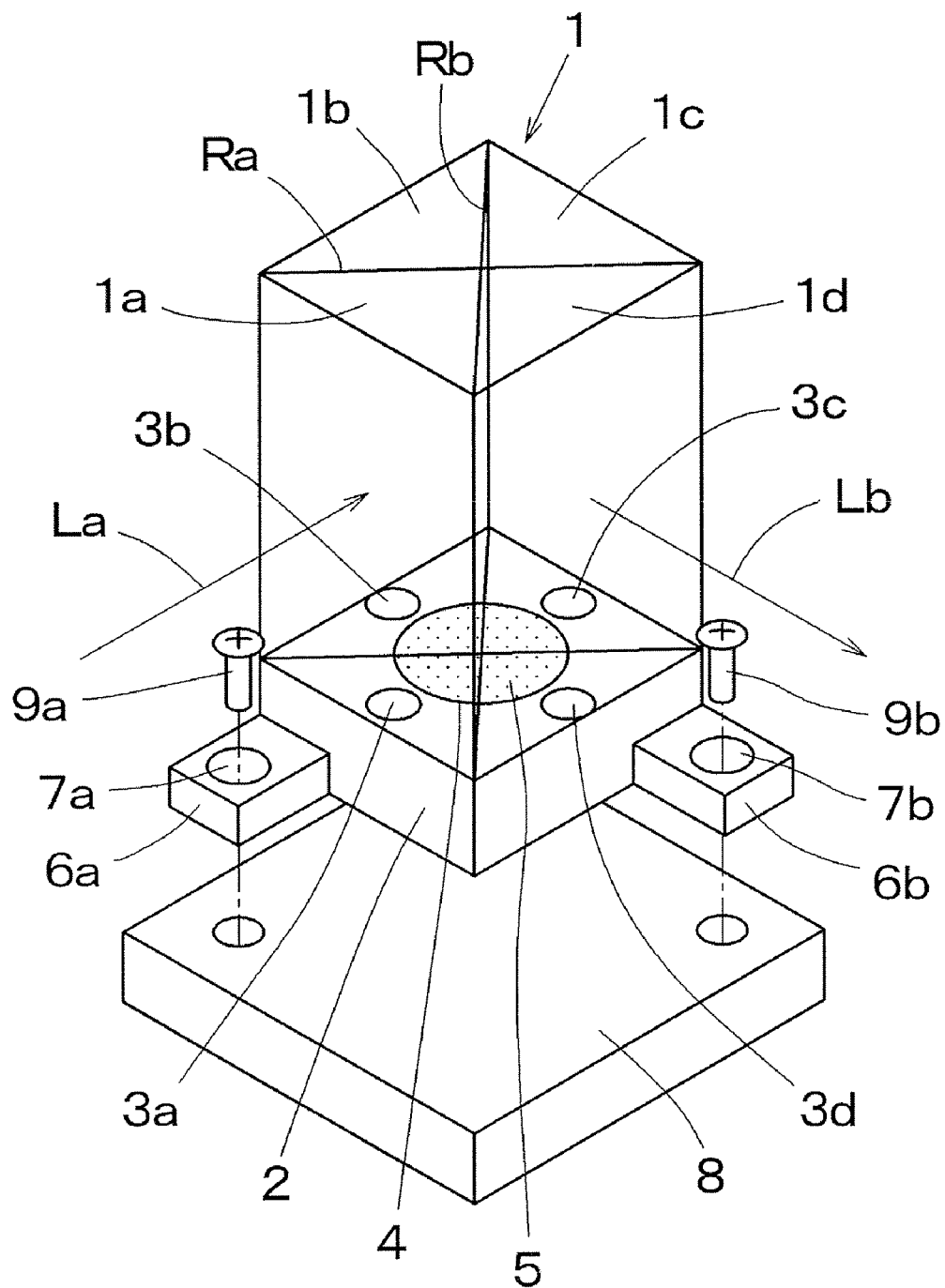
FIG. 1 is a perspective view of a prism unit according to a first embodiment.

FIG. 1 is a perspective view of a prism unit which is formed by bonding a prism 1 to a prism base 2. Four rectangular-equilateral-triangle columnar prism members 1a are bonded to the prism 1, and the prism 1 has a square shape. At least three (or four in this embodiment) circular seating surfaces 3a to 3d that maintain parallelisms are disposed on the prism base 2. Two seating surfaces 3 are arranged on both sides of each of a reflecting surface (an optical surface) Ra that serves as a joining surface between prism members 1a and 1b and between prism members 1c and 1d and a reflecting surface (an optical surface) Rb that serves as a joining surface between 1a and 1d and between prism members 1b and 1c.

The prism 1 is positioned by bringing it into contact with the seating surfaces 3a to 3d, and has a seating surface bonded part 4 surrounded by the seating surfaces 3a to 3d, and formed on a surface of the prism base 2 located at a distant position; the prism 1 is bonded to the base via an adhesive 5. No adhesive is adhered to the seating surfaces 3a to 3d, and configured to slide on interfaces with the seating surfaces 3a to 3d when the prism 1 stretches or shrinks due to the temperature differences.

In FIG. 1, a luminous flux La which enters the prism member 1a penetrates a prism 1a, reflects on the internal reflecting surface Ra, and exits as a luminous flux Lb from the prism member 1d. Since the lower joining surface orthogonal to the reflecting surface Ra defines the precision of the reflecting surface Ra, the joining surface of the prism 1 needs to be bonded to the prism base 2 precisely. If the prism 1 leans or rotates with respect to the prism base 2, the incident luminous flux La reflects in an unintended direction, and may lead to the deterioration of the optical performance. With the seating surfaces 3a to 3d, the prism 1 can be precisely bonded to the prism base 2.

Fixed parts 6a and 6b project from two points on the side surfaces of the prism base 2, and holes 7a and 7b perforate in the fixed parts 6a and 6b. The prism base 2 is disposed on the base 8, and the screws 9a and 9b that are put through the holes 7a and 7b fix the fixed parts 6a and 6b onto the base 8.

Figure 2A:
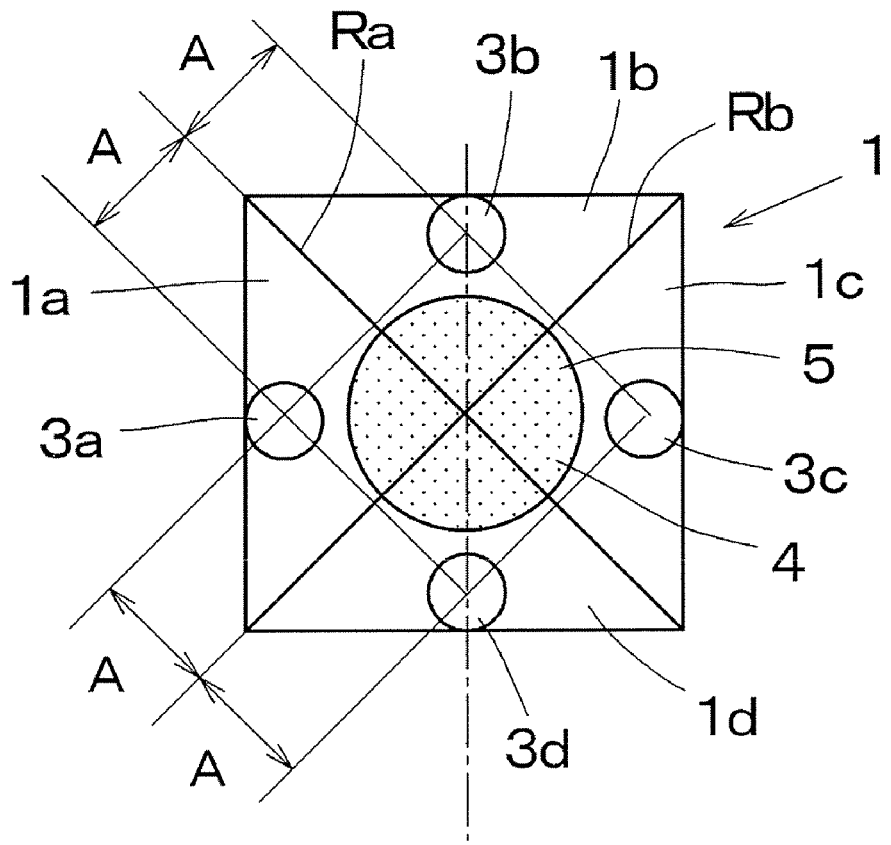
FIGS. 2A-2C are a plan view and a sectional view of a joining state of the prism unit.
Figure 2B:
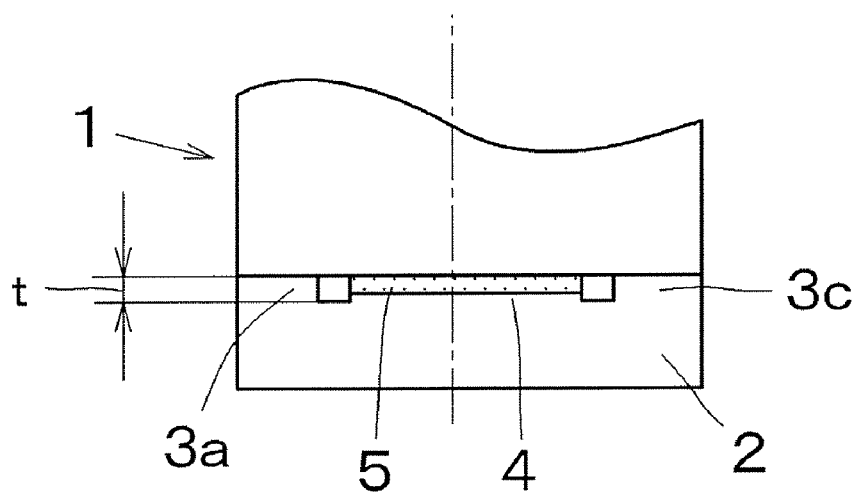

FIG. 2 shows a joining state between the prism 1 and the prism base 2. FIG. 2A is a plan view, and FIG. 2B is a sectional view. An aperture t is disposed among the seating surfaces 3a to 3d in the seating surface bonded part 4, and the amount of the adhesive 5 depends upon the size of the seating surface bonded part 4.

Two seating surfaces 3 are arranged at distances A on the both sides of the reflecting surface Ra that serves as a joining surface between the prism members 1a and 1b and between 1c and 1d, and the reflecting surface Rb that serves as a joining surface between the prism members 1a and 1d and between 1c and 1d. In other words, the seating surfaces 3a and 3b and the seating surfaces 3c and 3d are arranged on line-symmetrically with respect to the reflecting surface Ra, and the seating surfaces 3a and 3d and the seating surfaces 3b and 3c are arranged line-symmetrically with respect to the reflecting surface Ra. In addition, four seating surfaces 3a to 3d are arranged symmetrically with respect to the central axis of the prism 1.

In this way, the deterioration of the optical performance due to use environmental changes can be prevented by maintaining equal distances from the reflecting surfaces Ra and Rb to the seating surfaces 3a to 3d. An arrangement of the seating surfaces 3a to 3d on the circumference of the prism 1 increases distances among the seating surfaces 3, and the arrangement is advantageously resistant to the fall of the prism 1 when the seating surfaces 3a to 3d have the same height tolerance.

Figure 3A:
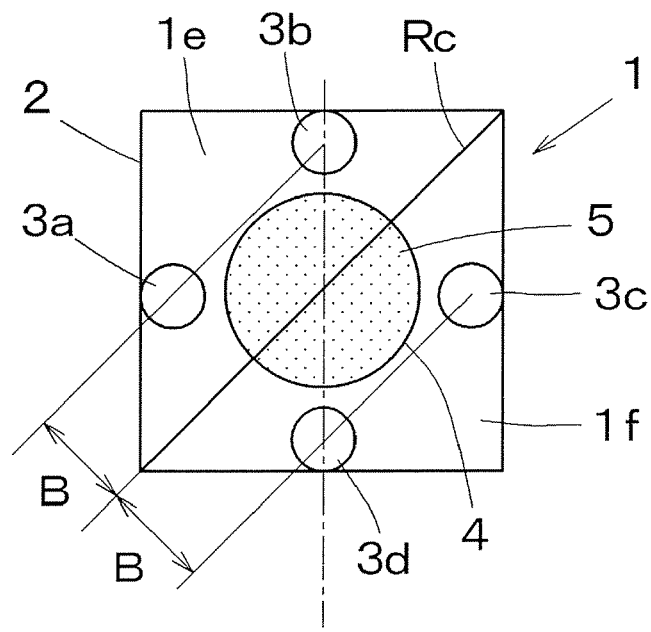
FIGS. 3A-3B are a plan view and a sectional view of the joining state of the prism unit.

FIG. 3 shows a square that is made by joining two prism members 1e and 1f, and has a reflection (the optical) surface Rc. On both sides of the reflecting surface Rc on the prism base 2, the seating surfaces 3a and 3d and the seating surfaces 3b and 3c are arranged symmetrically at distances B. If the distances B are all equal, the seating surfaces 3a to 3d are not necessarily arranged symmetrically to the central axis of the prism 1.

Figure 4A:
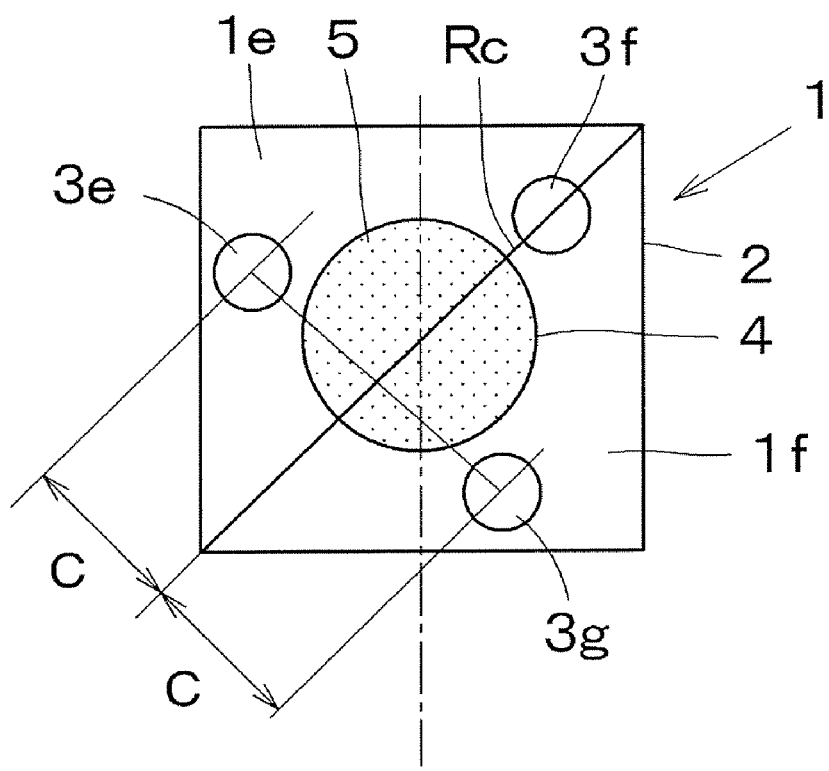
FIGS. 4A-4B are a plan view and a sectional view of the joining state of the prism unit.

In FIG. 4, the prism 1 is sustained by three spots of three seating surfaces 3e to 3g disposed on the prism base 2, symmetrical to the reflecting surface Rc through two prism members 1e and 1f. In this case, one seating surface 3f is disposed on the reflecting surface Rc, and other seating surfaces 3e and 3g are disposed at an equal distance from the reflecting surface Rc.

Figure 3B:
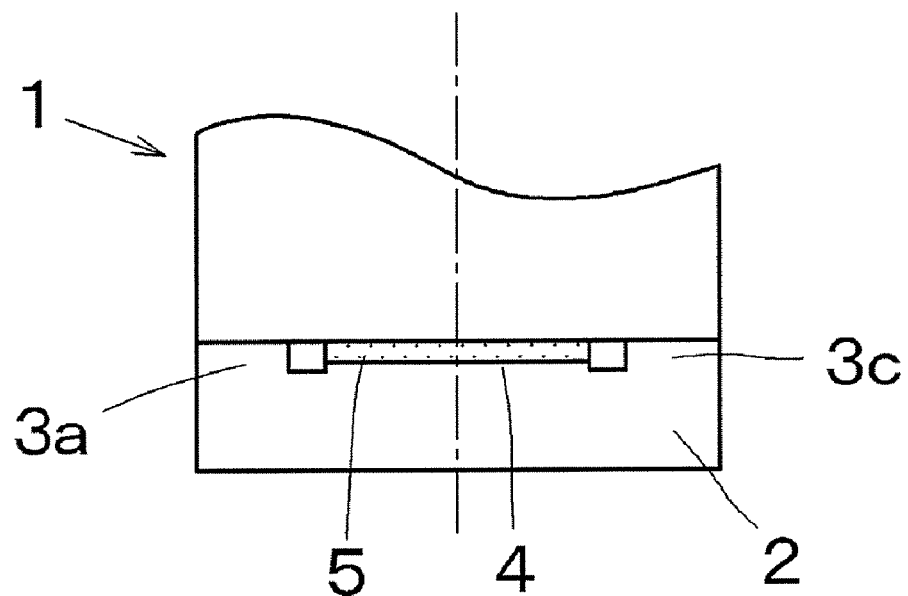
Figure 4B:
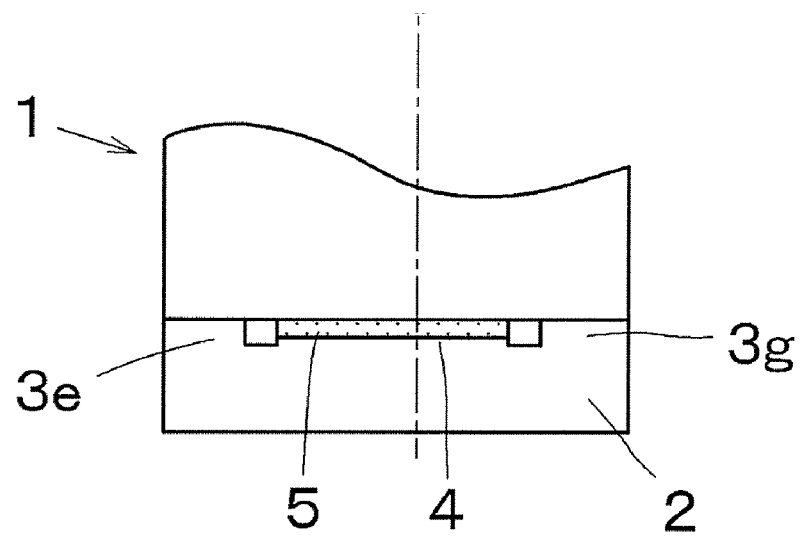

FIG. 2B, 3B, and 4B show sectional shapes of the seating surfaces 3 of the prism base 2 and the seating surface bonded part 4. The seating surface bonded part 4 is provided as an aperture set to be slightly lower than a surface of the prism base 2. The area of the prism base 2 and a defined aperture amount can control the amount of the adhesive 5, or the thickness and the size of the adhesive 5 by applying the adhesive 5 on the seating surface bonded part 4.

As the temperature of the prism 1 and the prism base 2 increase due to the environmental temperature changes, a difference in coefficient of linear expansion between the prism 1 and prism base 2 generates a tensile stress on the adhesive 5.

Figure 5:
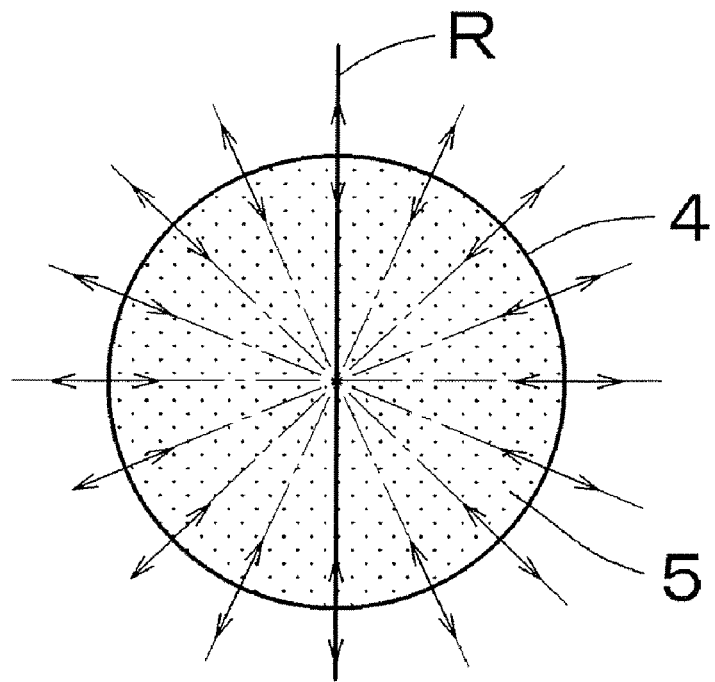
FIG. 5 is an explanatory view of a stress distribution and a shape of the seating surface bonded part.
Figure 6:
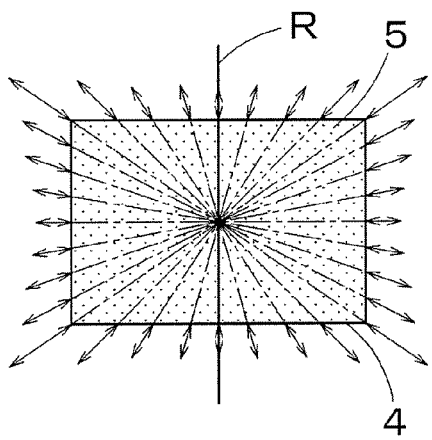
FIG. 6 is an explanatory view of a stress distribution and a shape of the seating surface bonded part.

FIG. 5 shows a circular seating surface 4, and FIG. 6 shows a rectangular seating surface 4; the seating surface 4 is arranged symmetrically with respect to the reflecting surface (optical surface) R. An arrow denotes a tensile direction, and the length of the arrow denotes the magnitude of the tensile stress.

While the circular seating surface shown in FIG. 5 generates a substantially equivalent tensile stress in the adhesive 5, the rectangular seating surface shown in FIG. 6 is advantageous in increasing the bonding area. The rectangular seating surface 3 generates high stresses at the four corners of the seating surface 3, and lower stress on the four sides than on the four corners. This is because a distance from the center of the seating surface bonded part 4 is different and an expansion by the linear expansion differs according to locations.

The prism 1 is made of an optical glass, and its coefficient of linear expansion is smaller than that of a synthesized resin or a metal generally used as the prism base 2, and thus the prism base 2 has a larger amount of the variation from the center of the seating surface bonded part 4 than the prism 1. On the other hand, the elastic deformation of the adhesive 5 can absorb a difference in linear expansion by setting the size and thickness of the seating surface bonded part 4 such that the elastic deformation amount of the adhesive 5 is larger than the difference in expansion amount between the prism 1 and the seating surface 3 at a position having a distance from the center to the end of the seating surface bonded part 4. A value of the tensile stress generated on the interface between the adhesive and the glass needs to be maintained within the permissible stress of the glass.

The reflecting surface R of the prism 1 arranged at the center of the seating surface bonded part 4 can minimize its variation even if a stress is generated on the adhesive 5. On the other hand, if the reflecting surface R of the prism 1 is not located at or is distant from the center of the seating surface bonded part 4, the position of the reflecting surface R varies in proportion to the distance from the center of the seating surface 3 because the prism 1 varies with respect to the center of the seating surface bonded part 4.

If the prism 1 and the prism base 2 expand due to the temperature changes, a frictional force occurs between the seating surface 3 and the prism 1. Accordingly, the generated frictional force can be made symmetrical with respect to the reflecting surface R by arranging the seating surface 3 symmetrically with respect to the reflecting surface R of the prism 1.

Figure 7A:
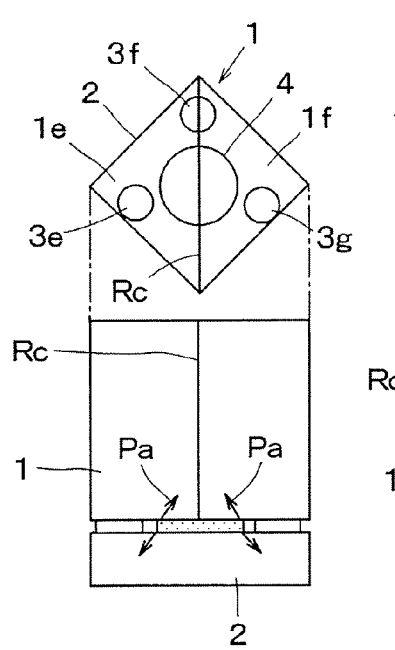
FIGS. 7A-7C are an explanatory view of a stress distribution and a shape of the seating surface bonded part in a prism unit.
Figure 7B:
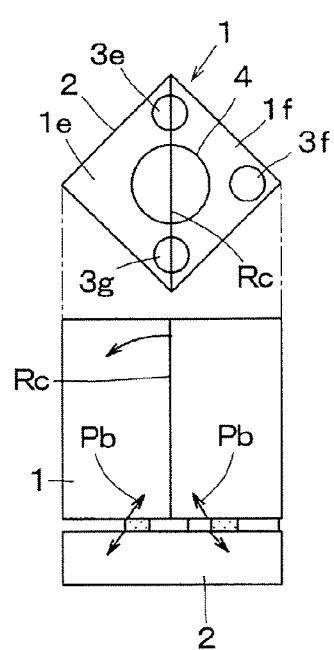
Figure 7C:
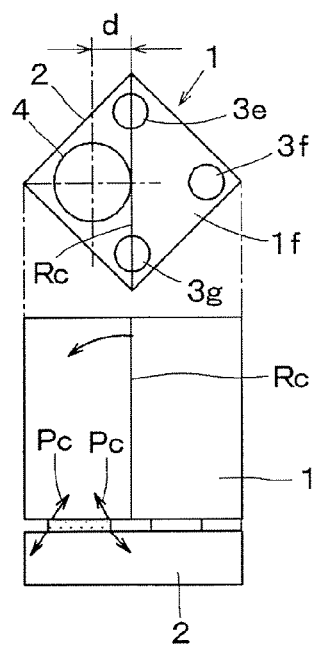

FIG. 7 explains a stress distribution of the prism unit that includes three seating surfaces 3e to 3g and one reflecting surface Rc when temperature rises. In FIG. 7A, two seating surfaces 3e and 3g are symmetrically arranged with respect of the reflecting surface Rc, one reflecting surface 3f is arranged on the reflecting surface Rc, and the seating surface 4 is arranged at the center of the reflecting surface Rc. In FIG. 7B, two seating surfaces 3e and 3g are arranged on the reflecting surface Rc, one seating surface 3f is arranged at another location, and the seating surface 4 is arranged at the center of the reflecting surface Rc. Further in FIG. 7c, two seating surfaces 3e and 3g are arranged on the reflecting surface Rc, one seating surface 3f is arranged at another location, and the seating surface 4 is arranged out of the reflecting surface Rc.

In FIG. 7A, the seating surface 3 can evenly receive a tensile stress Pa, if any. In FIG. 7B, the reflecting surface Rc of the prism 1 falls in an arrow direction when a tensile stress Pb is generated. In FIG. 7C, since the fall occurs similarly to FIG. 7B, and the seating surface bonded part 4 is distant from the reflecting surface Rc, the reflecting surface Rc moves in proportion to a distance d from the seating surface bonded part 4 to the reflecting surface Rc. While a description has been given of the temperature rise of the prism unit, this is similar when the temperature drops in the prism unit.

Therefore, the temperature caused deformations of the prism 1 do not impair the precision of the optical system by symmetrically arranging the seating surfaces 3 and the seating surface bonded part 4 respectively with respect to the reflecting surface Rc, as shown in FIG. 7A.

Figure 2C:
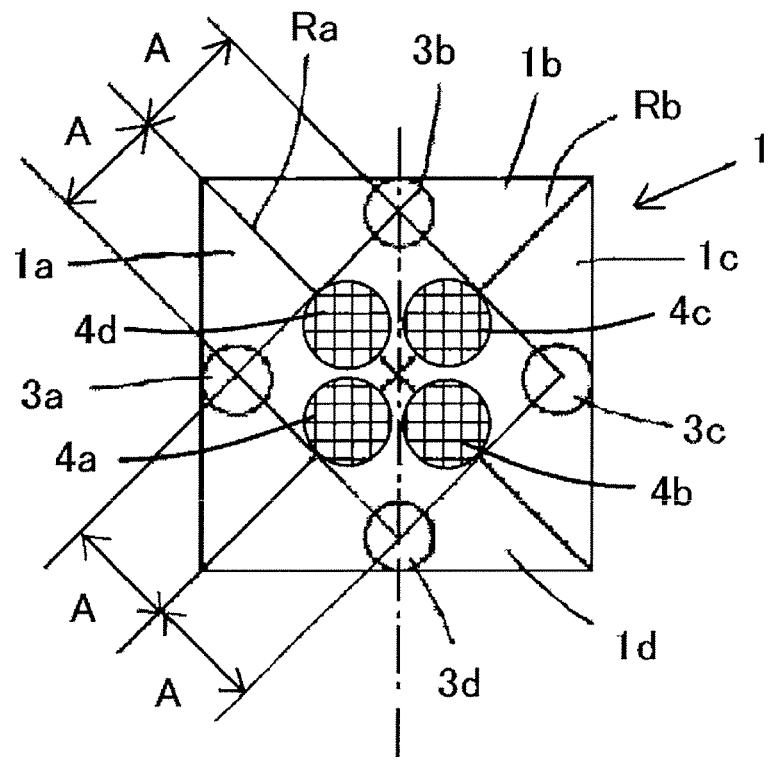

Although this embodiment arranges one seating surface bonded part 4 so that the reflecting surface R is arranged at the center of the circular seating surface bonded part 4, a plurality of seating surface bonded parts may be arranged symmetrically with respect to the reflecting surface R as shown in FIG. 2C. FIG. 2C is a variation of FIG. 2A, and shows a jointing state between the prism 1 and the prism base. The jointing state includes four seating surface bonded parts 4a, 4b, 4c, 4d that are arranged symmetrically with respect to the reflecting surface R. Further, as long as at least one seating surface bonded part arranged on the reflecting surface R of the prism 1 is a proper structure, because it prevents the prism's cracks or reduces positional fluctuations of the reflecting surface R.

[Embodiment 2]

Figure 8:
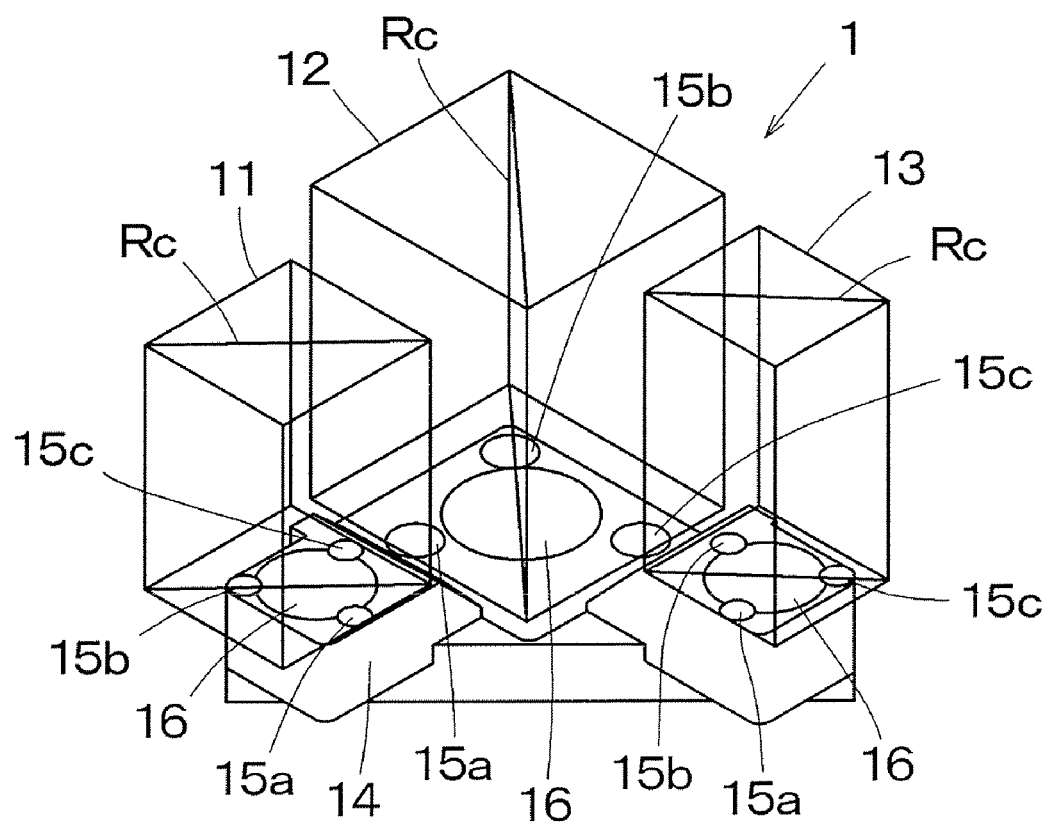
FIG. 8 is a perspective view of a prism unit according to a second embodiment.
Figure 9:
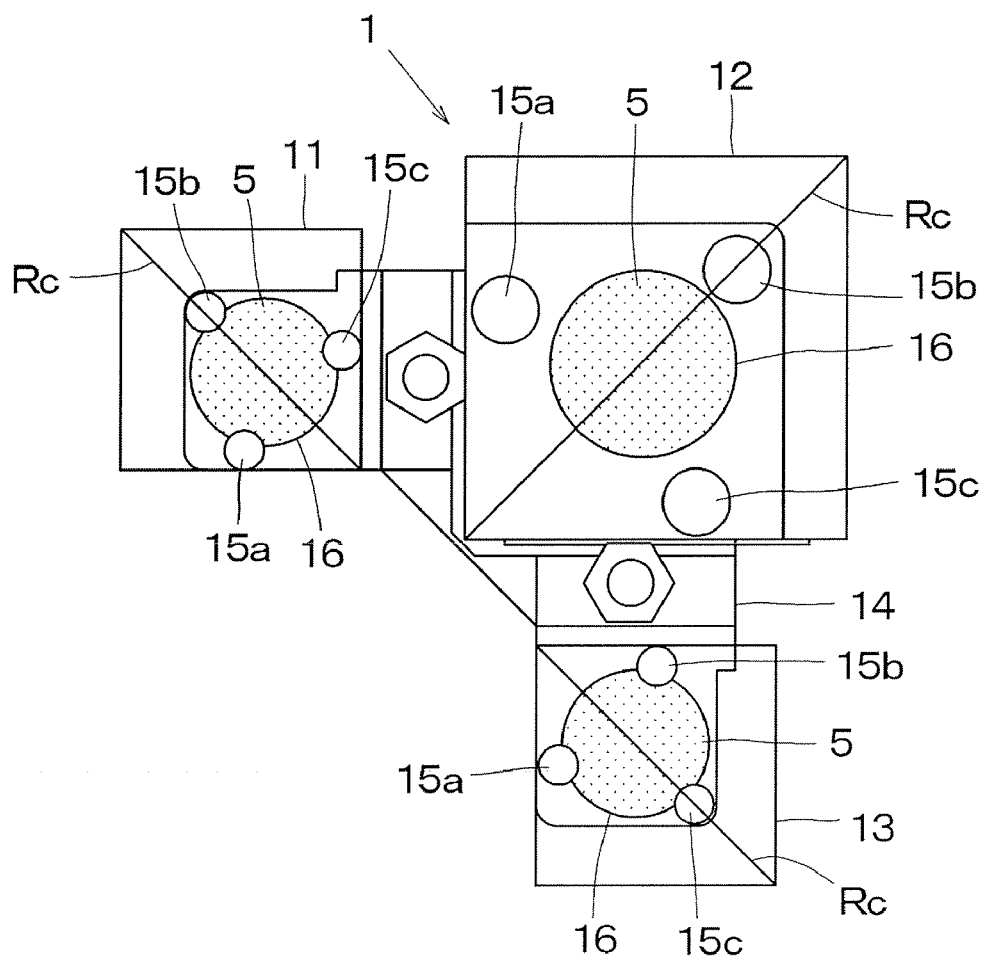
FIG. 9 is a plan view of the prism unit according to the second embodiment.
Figure 10:
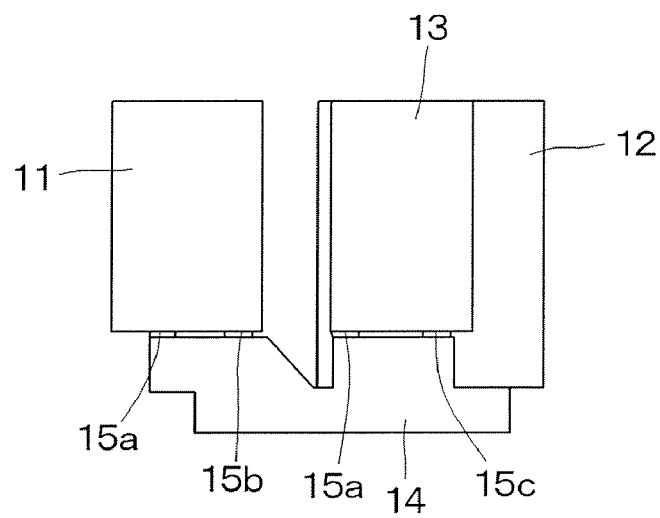
FIG. 10 is a sectional view of the prism unit according to the second embodiment.
Figure 11:
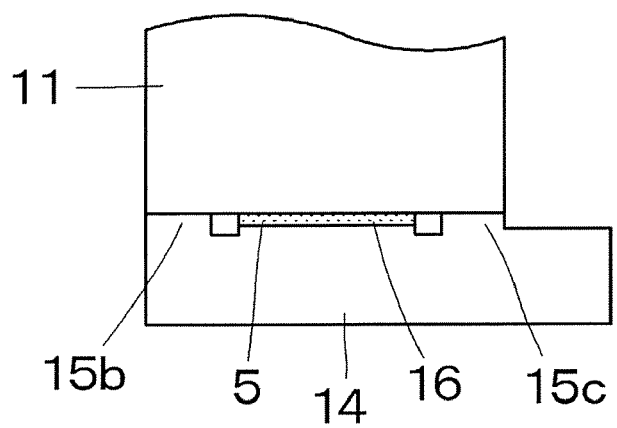
FIG. 11 is a partially enlarged view of the prism unit according to the second embodiment.

FIG. 8 is a perspective view of a prism unit according to a second embodiment. FIG. 9 is a plan view, FIG. 10 is a side view, and FIG. 11 is a sectional view of the prism unit. Three prisms 11, 12, and 13 are pasted onto one connection prism base 14. Three circular seating surfaces 15a to 15c are respectively disposed on the top surface of the connection prism base 14 to which the prisms 11 to 13 are joined, and the seating surfaces 15a to 15c are formed with defined parallelisms. Accordingly, the precision in the positional relationship between each other is ensured by placing the bottom surfaces of the prisms 11 to 13 on three seating surface 15a to 15c. Further, the seating surface bonded part 16 is disposed on the connection prism base 14 in a slightly lower position than the three seating surfaces 15a to 15c.

Figure 12:
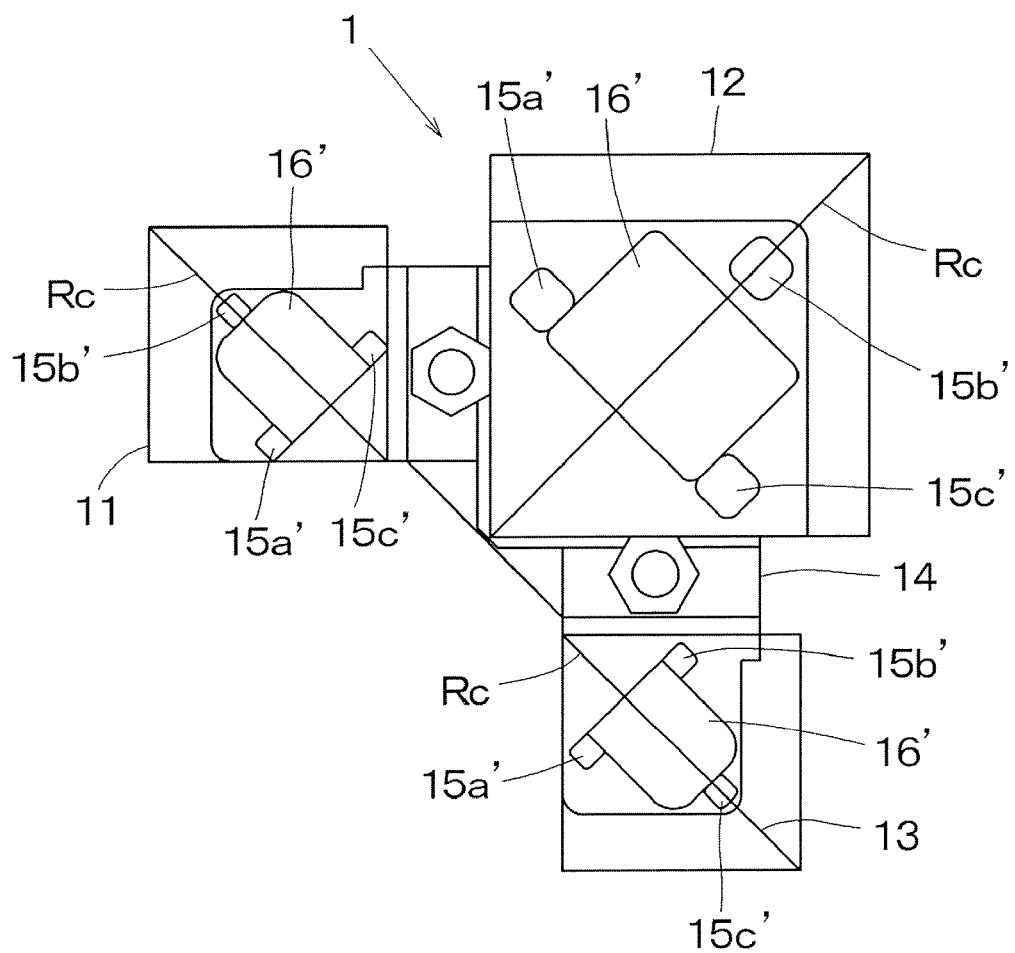
FIG. 12 is a plan view of a variation of the prism unit.

Although the above description has been given of the circular seating surfaces 15a to 15c and the circular seating surface bonded part 16, FIG. 12 shows a variation in which seating surfaces 15a' to 15c' and seating surface bonded part 16' respectively have rectangular shapes. Although an arrangement of the seating surfaces 15a' to 15c' is similar to that in FIG. 9, sides of the seating surfaces 15a' to 15c' and the side of the seating surface bonded part 16' are disposed in parallel to the reflecting surface Rc. In this way, the rectangular seating surfaces 15a' to 15c' and the rectangular seating surface bonded part 16' can secure larger areas, and the prisms 11 to 13 can improve the peel strength and stabilize their orientations. The shapes are not necessarily limited to this embodiment, and the seating surfaces 15a' to 15c and the seating surface bonded part 16' may have polygonal shapes.

[Embodiment 3]

Figure 13:
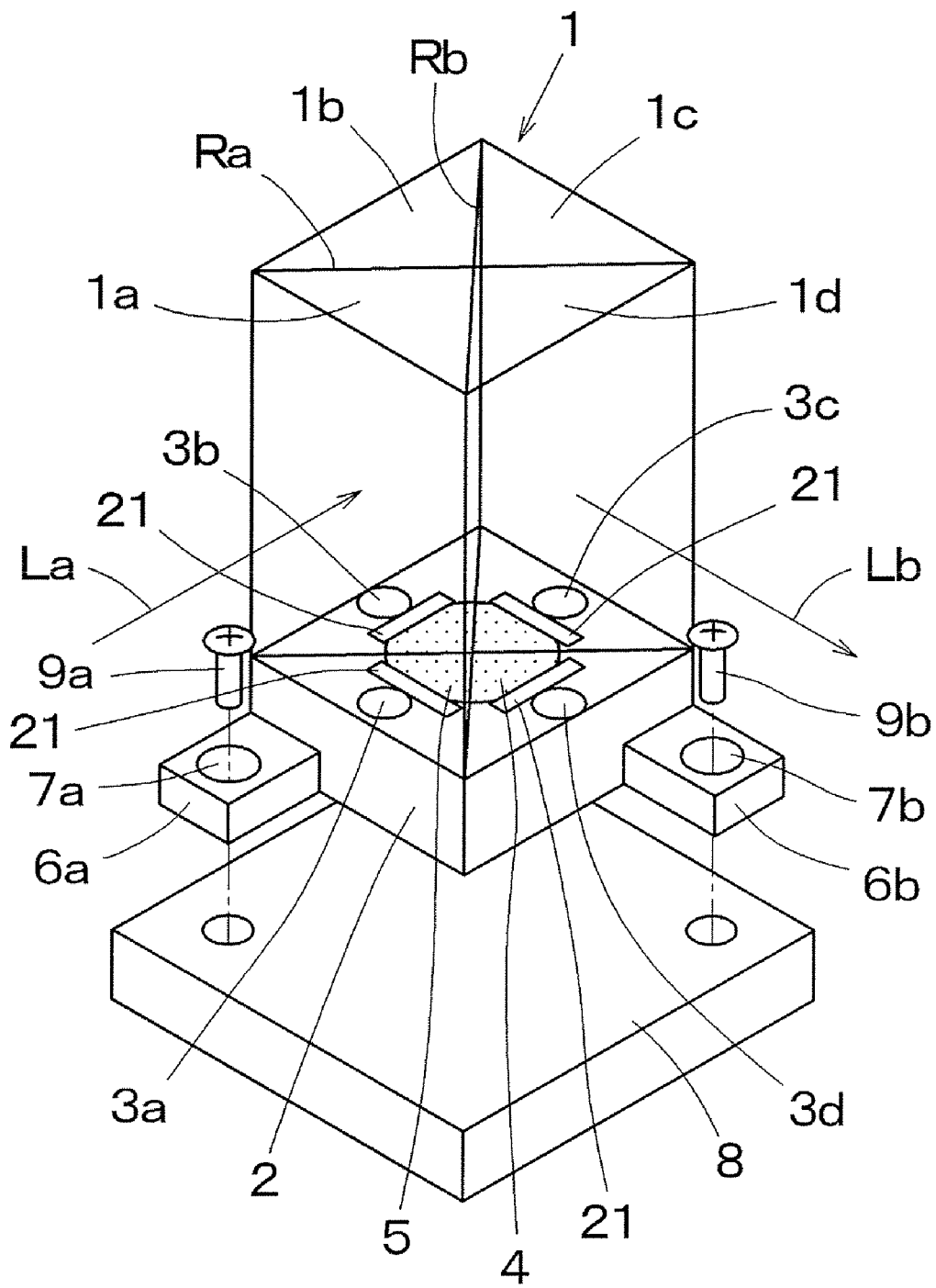
FIG. 13 is a perspective view of a prism unit according to a third embodiment of the present invention.

FIG. 13 is a perspective view of a prism unit according to a third embodiment, which has a groove 21 configured to store extra adhesive 5 on the prism base 2 in addition to the structure of the prism unit in FIG. 1. Those reference numerals in FIG. 13, which are designated by the same reference numerals in FIG. 1, will be the same elements in FIG. 1.

In the arrangement of the seating surfaces 3 and the seating surface bonded part 4 according to the first embodiment, the adhesive 5 may stick out of the seating surface bonded part 4 in applying the adhesive 5 to the seating surface bonded part 4 that is slightly lower than the prism base 2 for the UV adhesion. Conceivably, the adhesive 5 which sticks out enters a small aperture between the seating surfaces 3a to 3d and the prism 1, and will bond them together.

Figure 14A:
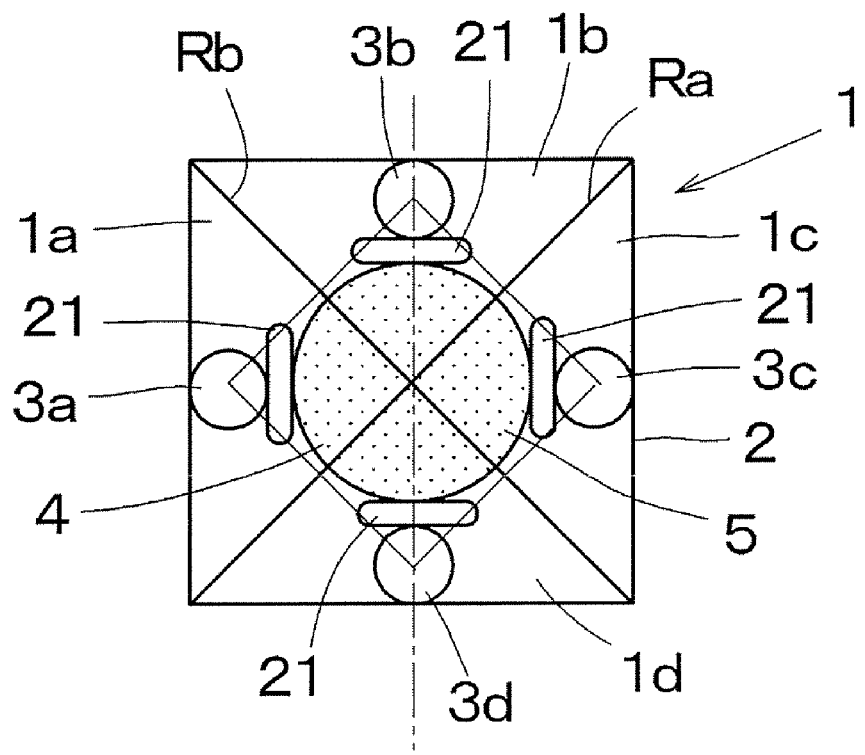
FIGS. 14A-14B are a plan view and a sectional view of a joining state of a prism unit.
Figure 14B:
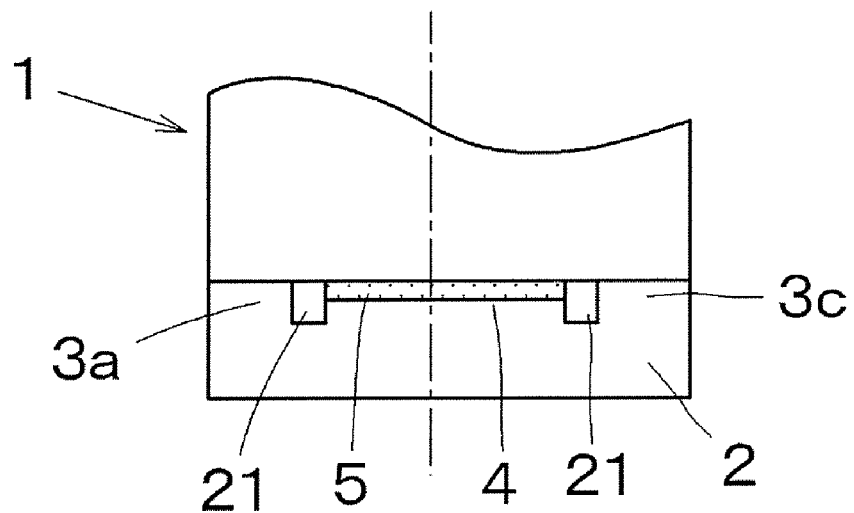
Figure 15A:
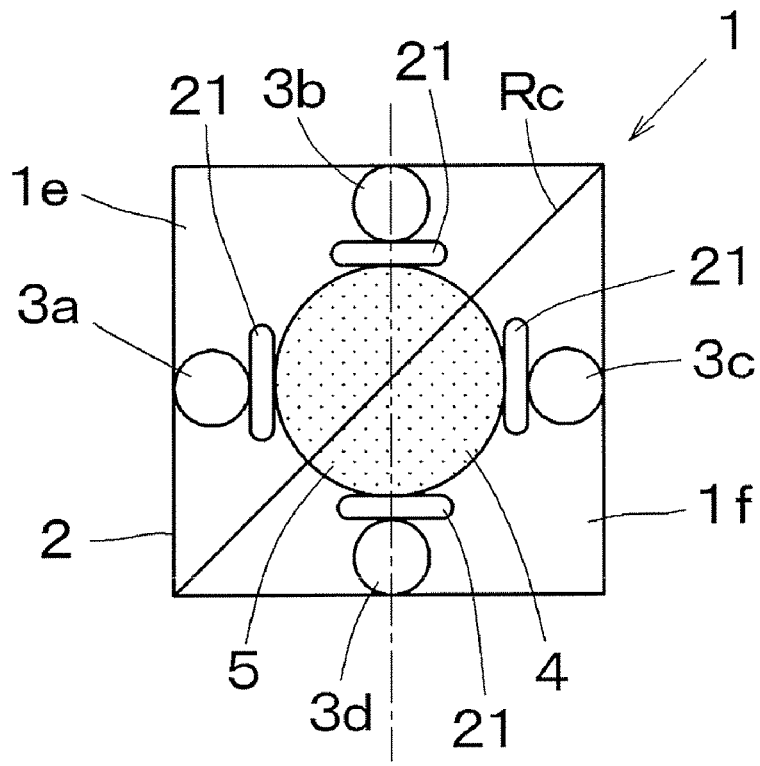
FIGS. 15A-15B are a plan view and a sectional view of the joining state of the prism unit.
Figure 15B:
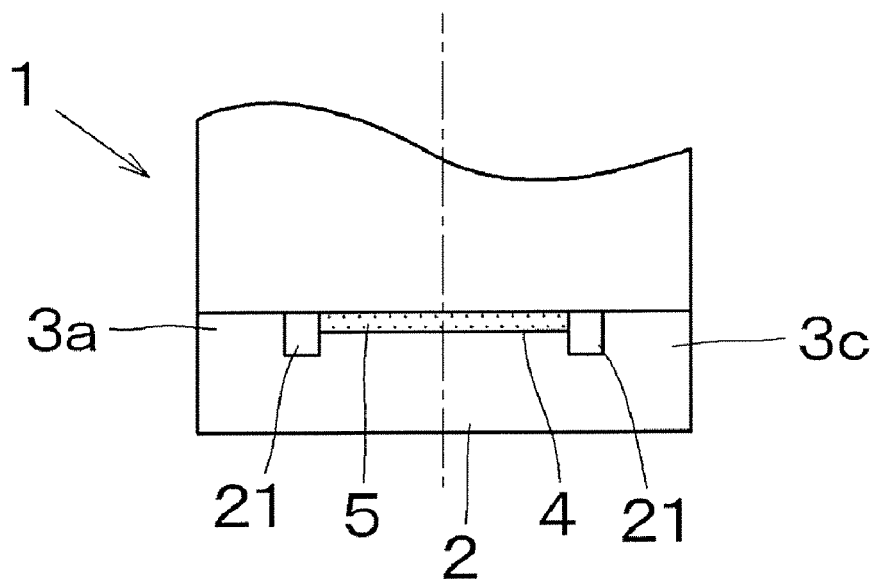
Figure 16A:
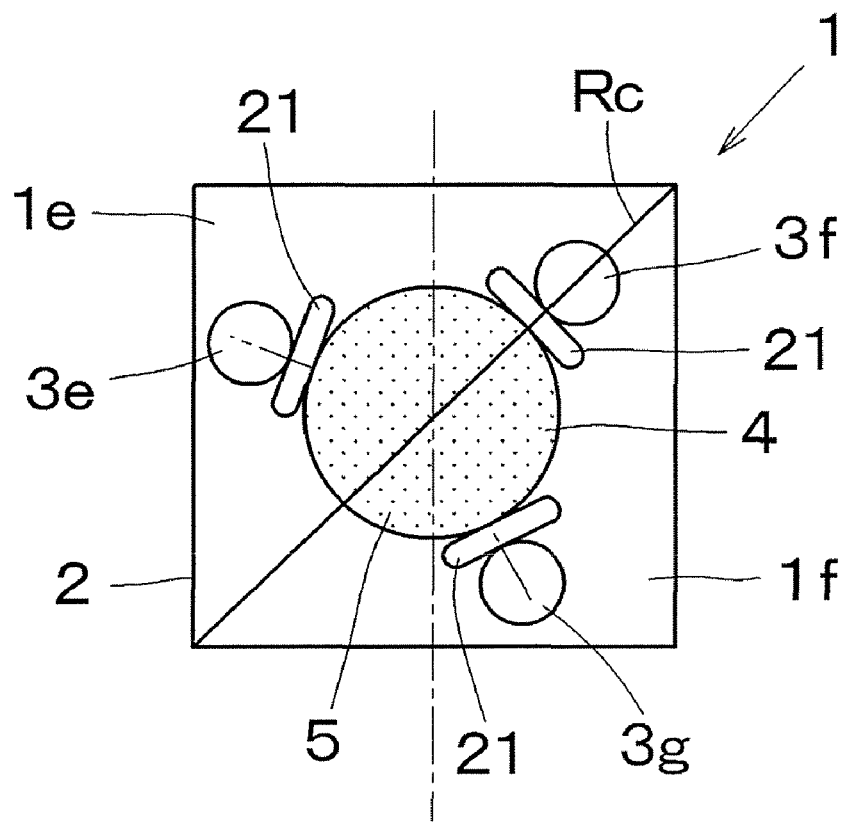
FIGS. 16A-16B are a plan view and a sectional view of the joining state of the prism unit.
Figure 16B:
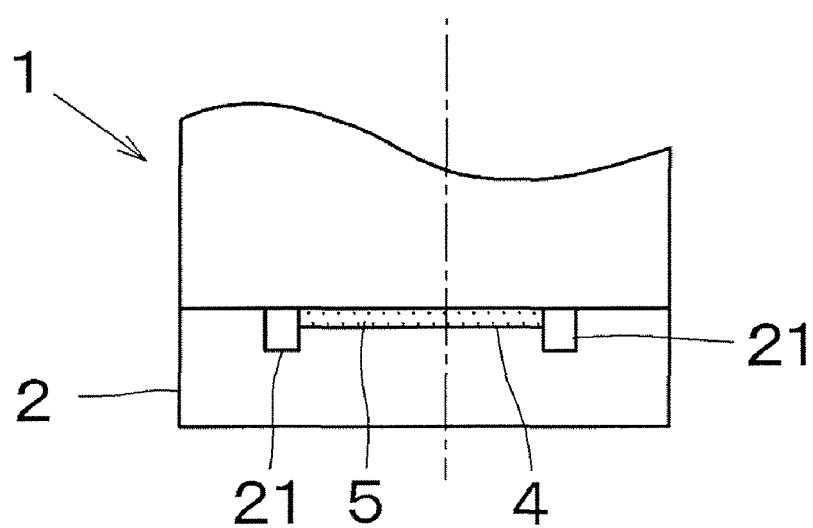

In FIG. 13, the circular seating surface bonded parts 4 neighbor at four spots between the seating surfaces 3a to 3d and the seating surface bonded parts 4 on the prism base 2, and forms the linear grooves 21 between the seating surface bonded parts 4. The grooves 21 are deeper than the seating surfaces 4 in FIGS. 14 and 15, which correspond to FIGS. 2 and 3. The grooves 21 are also formed among the seating surfaces 3e to 3g and the seating surface bonded part 4 in FIG. 4 corresponding to FIG. 16.

In this manner, the extra adhesive 5 sticking out of the seating surface bonded part 4 flows into the grooves 21 without spreading around, and prevents the adhesive 5 from curing with a thin thinness by permeating into a space among the seating surfaces 3 and the prism 1.

With reference to FIGS. 13 to 16, a description has been given of the grooves 21 when the seating surfaces 3 and the seating surface bonded part 4 are distant from each other. However, as the prism 1 becomes smaller, the seating surfaces 3 and the seating surface bonded parts 4 may have to be arranged close to each other. When the prism 1 becomes smaller, the area of the seating surface bonded part 4 needs to be smaller accordingly whereas a large area of the seating surface bonded part 4 is effective in order to maintain the peeling strength of the prism 1.

Figure 17A:
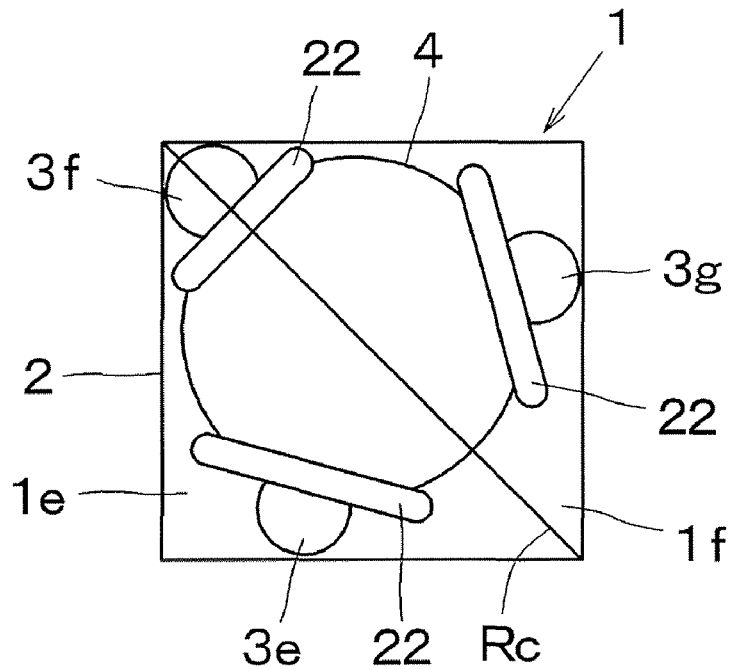
FIGS. 17A-17C are plan views of a variation of a prism unit.
Figure 17B:
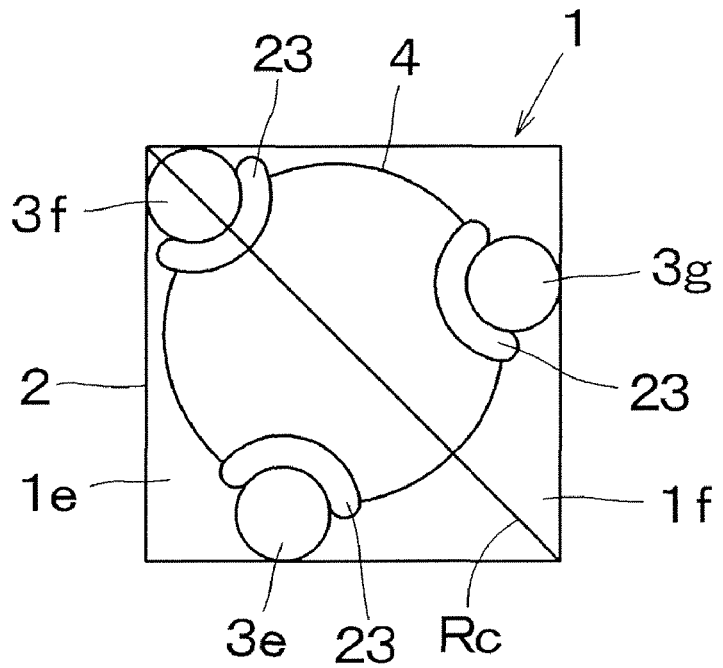
Figure 17C:
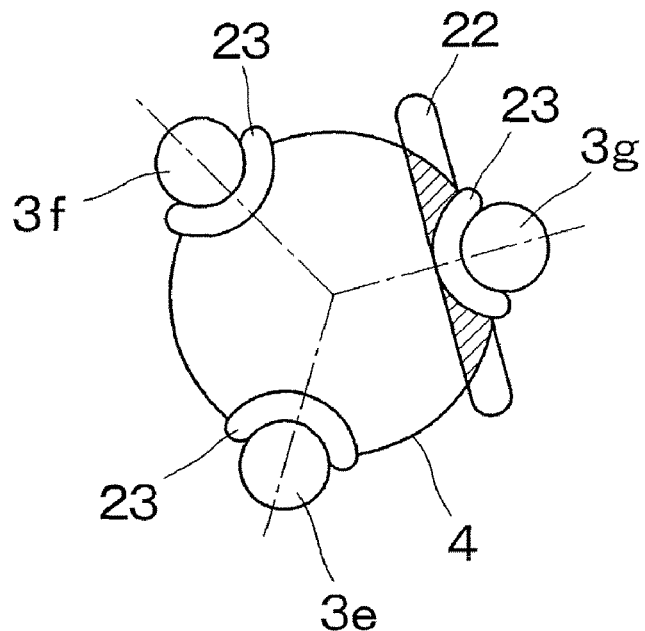

FIG. 17 shows a plan view of a variation of the prism unit, in which the grooves break in the seating surface bonded part 4. FIG. 17A shows a linear grooves 22 with respect to the seating surface 3, and FIG. 17B shows an arcuate grooves 23 along the seating surfaces 3. It is understood from FIG. 17C that the usable area of the seating surface bonded part 4 differs by a dotted part when the linear groove 22 is compared with the arcuate groove 23. In other words, the area of the seating surface bonded part 4 can be made larger when the arcuate groove 23 is formed along the seating surface 3.

[Embodiment 4]

Figure 18:
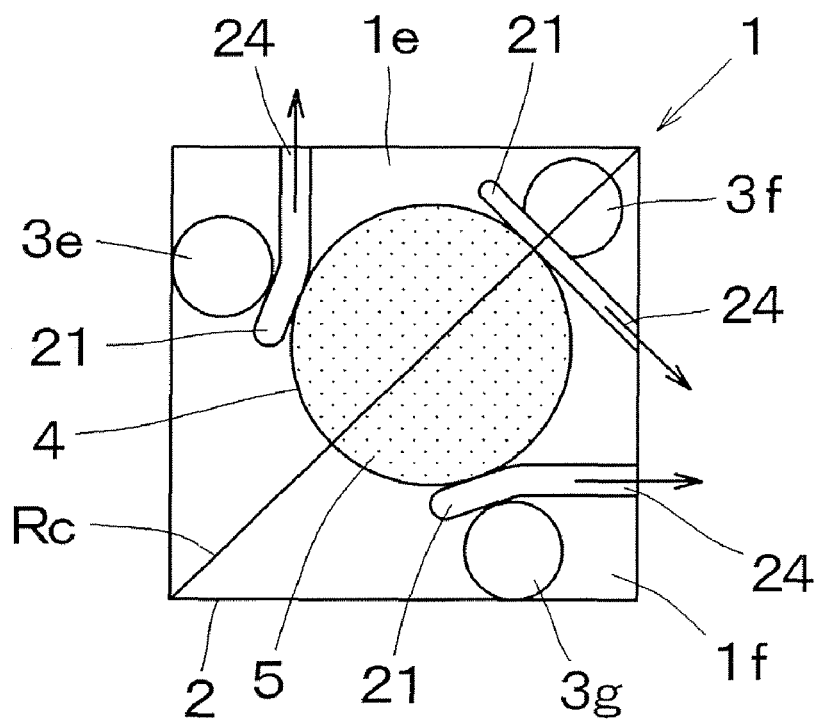
FIG. 18 is a plan view of a prism unit according to a fourth embodiment.

FIG. 18 shows a plan view of the prism unit according to a fourth embodiment, in which ends of three grooves 21 disposed among three prism bases 3e to 3g and the seating surface bonded part 4 extend to the end of the prism base 2. For example, a large amount of uncured adhesive 5 may remain in the grooves 21 in the configuration shown in FIG. 13. When the prism unit is configured as a product, the adhesive 5 may exude, and the exuding adhesive 1 may be naturally cured due to the exposure to light.

The fourth embodiment forms the groove ends 24 by extending one end of the grooves 21 to the end of the prism base 2. Thereby, the uncured adhesive 5 from the groove ends 24 through their lateral openings in the sides of the prism base 2 can be sucked in the arrow directions after the prism 1 is bonded to the prism base 2 by the UV curing. This can remove the extra amount of the adhesive 5, and the prism unit may improve the reliability because the adhesive 5 exists only on the seating surface bonded part 4, achieving an ideal bonding condition.

Figure 19:
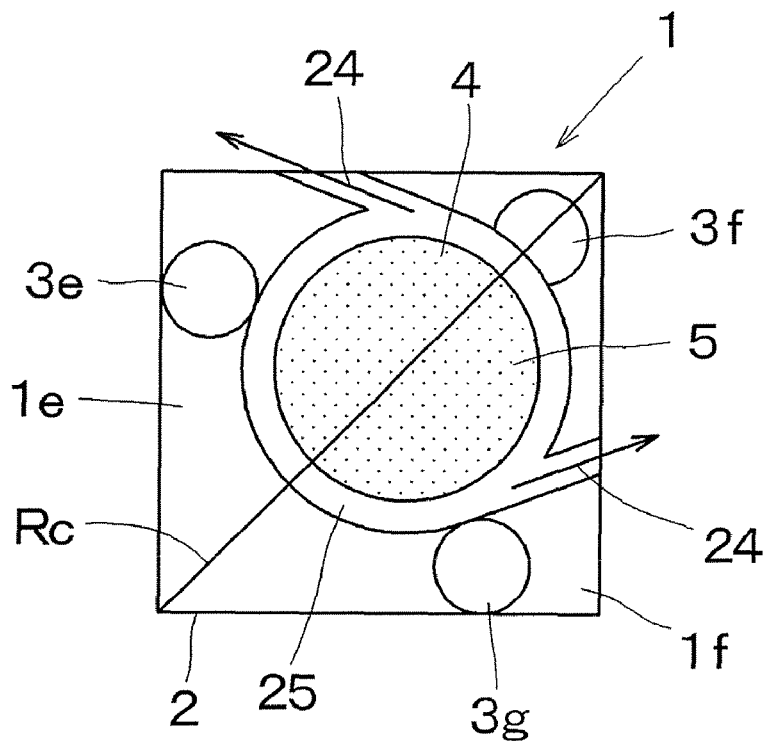
FIG. 19 is a plan view of a variation of a prism unit.

Although the above embodiment provides the grooves 21, 22, and 23 individually among the seating surfaces 3 and the seating surface bonded part 4, a plurality of grooves 21, 22, and 23 may be also configured as one continuous unit. FIG. 19 is a plan view of a variation, in which an annular groove 25 which surrounds the seating surface bonded part 4 is formed by connecting the individual grooves 21, 22, and 23 to each other. Further, a part of the annular groove 25 diverges into one or more grooves, and extends to the end of the prism base 2, and the groove ends 24 is formed. In this case, similarly to FIG. 18, the uncured adhesive 5 which remains in the circular groove 25 from the groove ends 24 may be sucked and removed from the groove 25.

Figure 20:
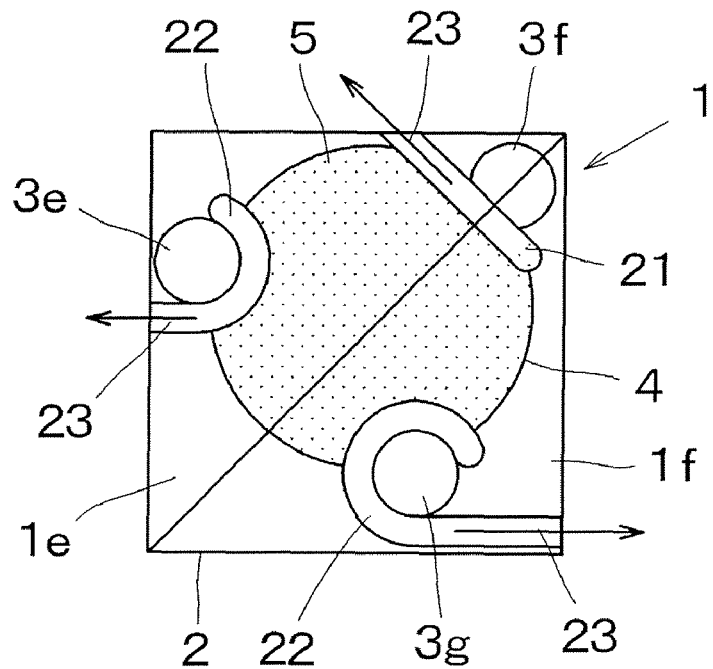
FIG. 20 is a plan view of still another variation of a prism unit.

FIG. 20 shows yet another variation, in which the groove ends 24 are provided by extension of the linear groove 21 formed among the seating surface 3f and the boded seating surface 4 and the arcuate groove 22 formed along the seating surfaces 3e and 3g to the end of the prism base 2.

[Embodiment 5]

Figure 21:
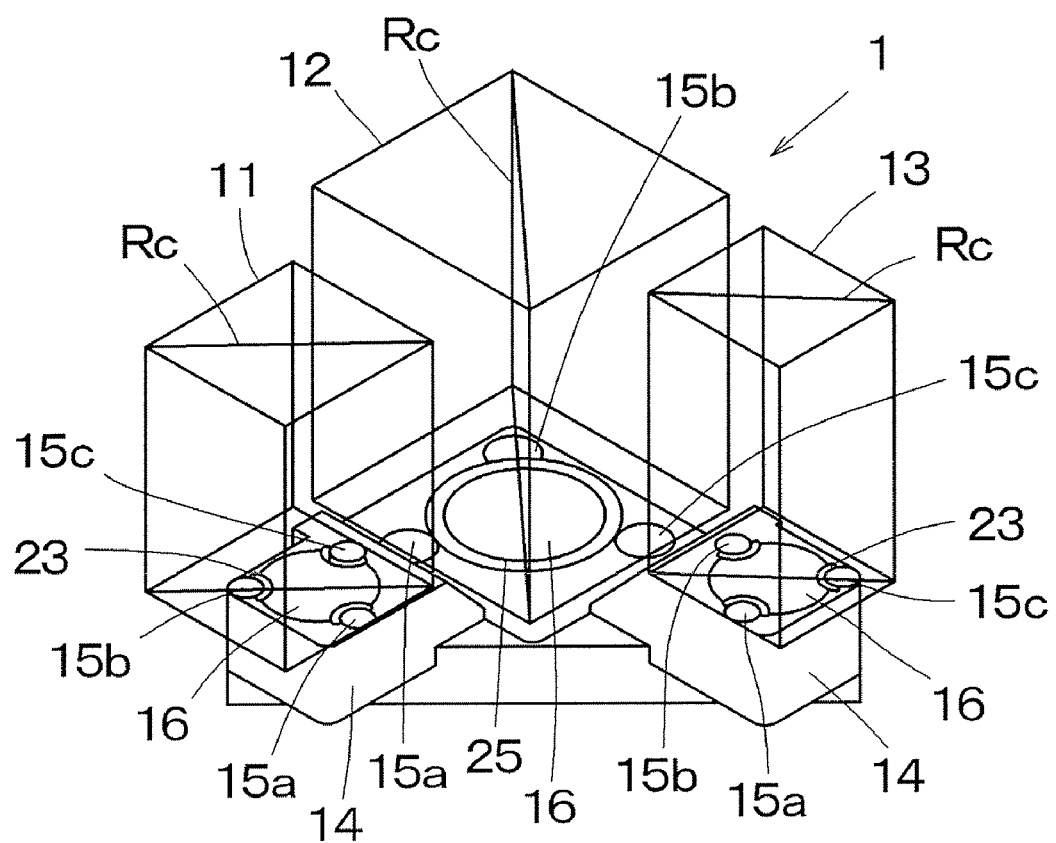
FIG. 21 is a perspective view of a prism unit according to a fifth embodiment of the present invention.
Figure 22:
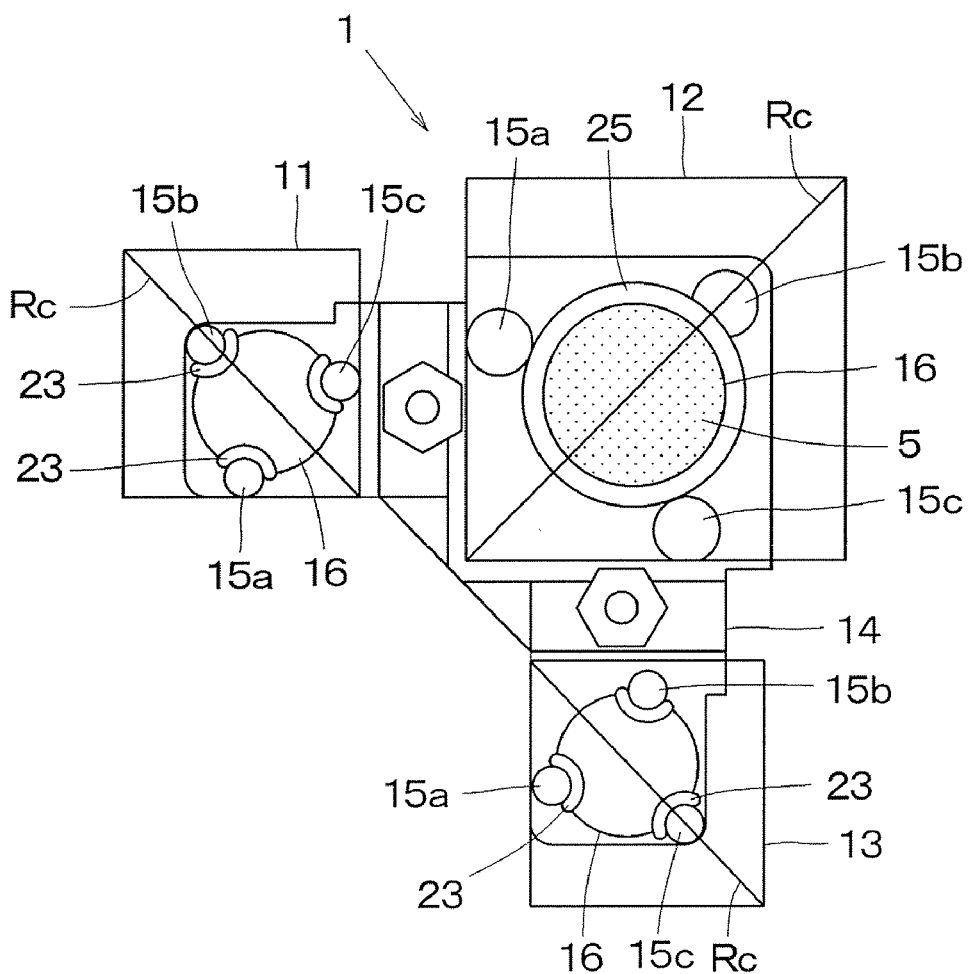
FIG. 22 is a plan view of the prism unit.
Figure 23:
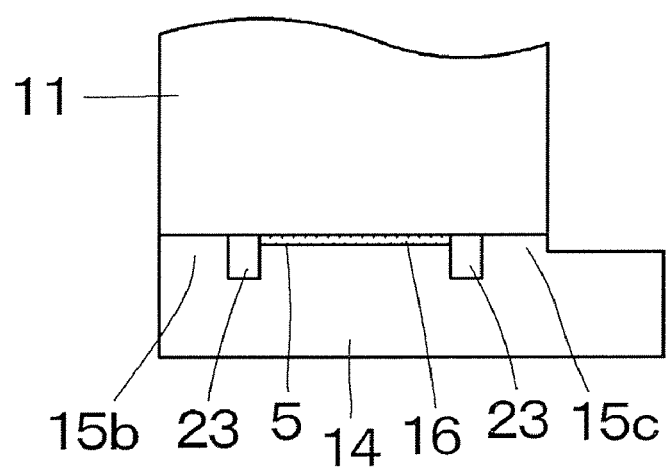
FIG. 23 is a sectional view of the prism unit.

FIG. 21 is a perspective view of a prism unit according to a fifth embodiment, which corresponds to FIG. 8. FIG. 22 is a plan view, and FIG. 23 is a sectional view where the arcuate groove 23 and annular groove 25 are provided on each of the prisms 11 to 13 on the connection prism base 14.

Figure 24:
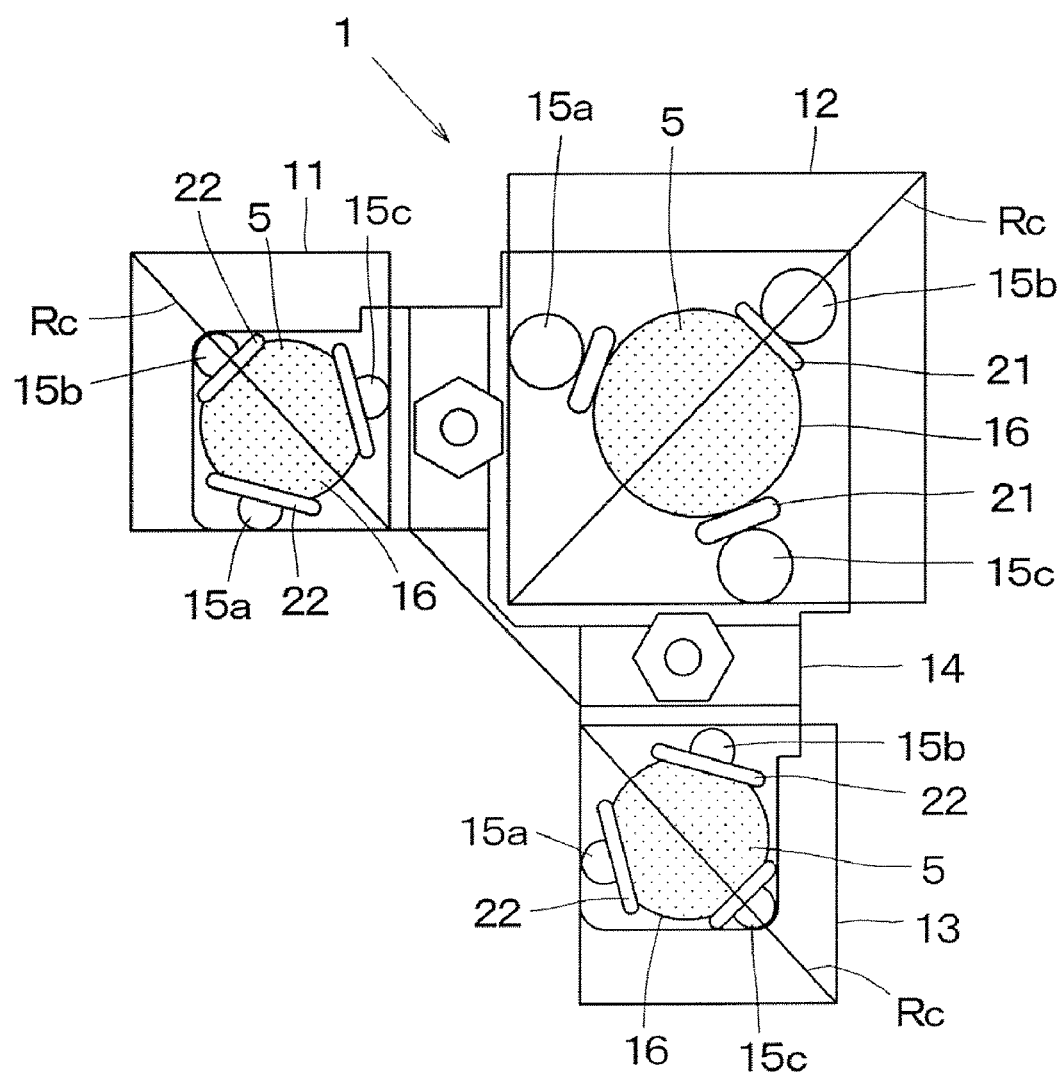
FIG. 24 is a plan view of a variation of the prism unit.

FIG. 24 shows a variation that has only the linear grooves 21 and 22, and the sufficiently large prisms 11 to 13 enough to secure areas of the seating surface 15a to 15c and the seating surface bonded part 16.

Figure 25:
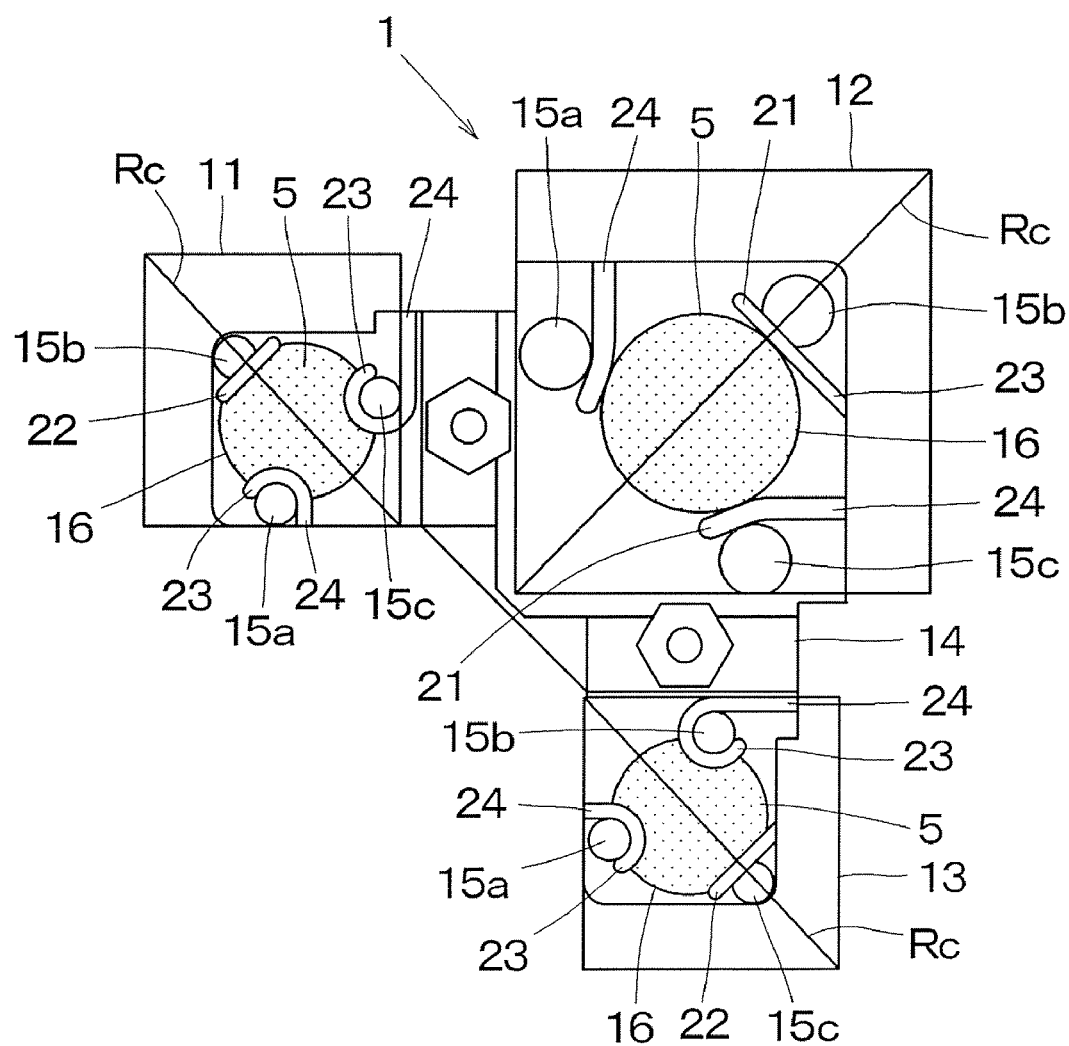
FIG. 25 is a plan view of another variation of the prism unit.

FIG. 25 shows another variation, in which the grooves 21, 22, and 23 formed around the seating surface bonded part 16 extend to the ends of the connection prism base 14 so as to for the groove ends 24. Similarly to the previous embodiments, the groove ends 24 can prevent unnecessary portions of the adhesive 5 from sticking out of the seating surface bonded part 16 and from permeating into and curing in a space among the seating surfaces 15a to 15c and the prisms 11 to 13.

[Embodiment 6]

When the prism unit is actually used in a liquid crystal projector, the prism 1 is heated when the light transmits through the prism. When a polarization plate is bonded to the prism, the heat also occurs due to an unnecessary polarization component that has been cut by the polarization plate. The heat generated by these heat generators transmits inside the prisms, and also reaches the prism base. For this reason, a cooling configuration of the prism base is used to radiate the heat. Since a coefficient of linear expansion is different among the prisms and the prism base, their deformation amounts are also different even with a slight temperature rise but the adhesive among the prisms and the prism base serves as an elastic body that absorbs the deformation.

Figure 26:
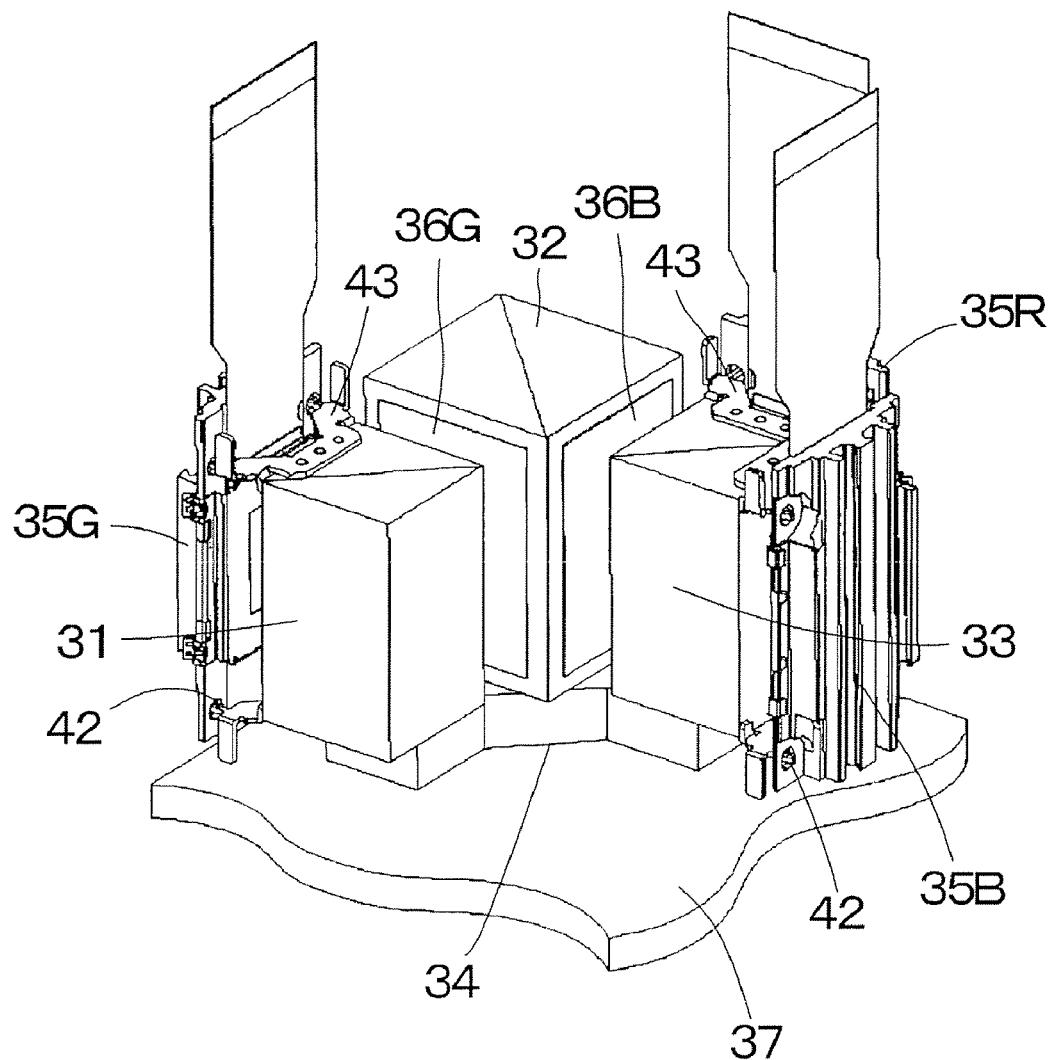
FIG. 26 is a perspective view of a prism unit which serves as a separation optical system according to a sixth embodiment of the present invention.
Figure 27:
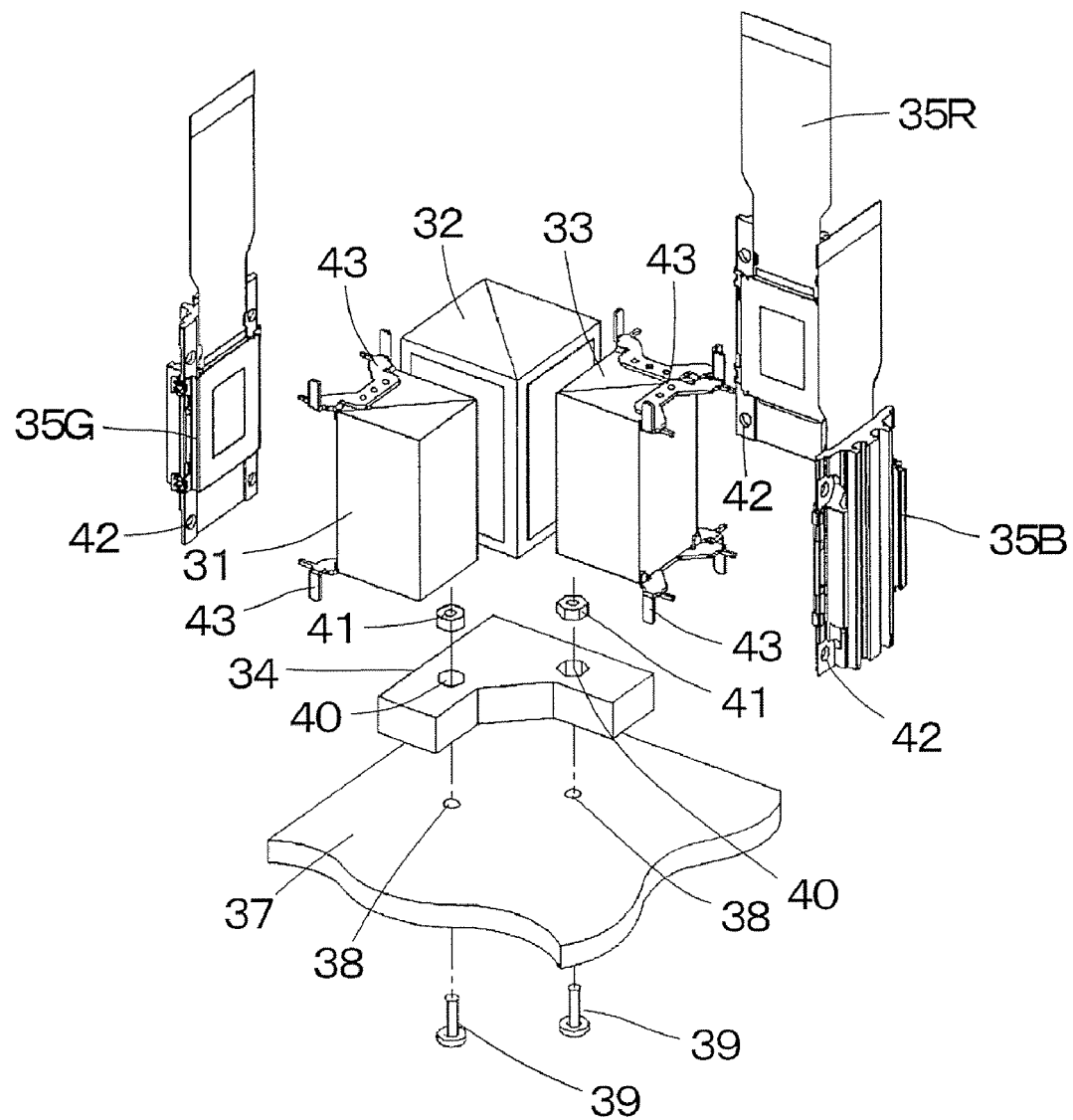
FIG. 27 is an exploded perspective view of the prism unit according to the sixth embodiment of the present invention.

FIG. 26 is a perspective view of a prism unit which serves as a color separation optical system disposed on the prism base, and FIG. 27 is its exploded perspective view. A green light path prism 31, a synthesis prism 32, and a red-blue light path prism 33 are bonded to one connection prism base 34 (whose base is not shown) and form a prism unit. A reflective liquid crystal panel 35G including a quarter waveplate is bonded to the green light path prism 31. Reflective liquid crystal panels 35R and 35B are bonded to the red-blue light path prism 33. A heat sink is provided to each liquid crystal panel 35. A green light exiting side polarization plate 36G comprised of a dielectric multilayer film is bonded to the synthesis prism 32 on the prism 31 side, and the blue light exiting side polarized light 36B is bonded to the prism 33 side.

Further, two openings 38 are also provided on the prism base 37, and configured to fix the base through an opening 40 of the connection prism base 34 and a nut 41 by inserting a screw 39 from the opposite side of the prism base 37. A panel holding tool 43 bonds and holds the liquid crystal panels 35R to 35B to the prisms 31 and 33 by the UV-curing adhesive.

In the reflective liquid crystal panels 35R to 35B, adhesion holes 42 open at the four corners for the heat sink, and the protrusions projecting from the holding tool 43 that is bonded to the prisms 31 and 33 are inserted into the holes 42 at the four corners of the heat sink. A UV-curing adhesive is applied to the holes 42 at the four corners of the heat sink so as to fix the relative positions after the relative positional shifts of the three colored liquid crystal panels 35R to 35B are adjusted.

In bonding the prisms 31 to 33 to the connection prism base 34, the relative distances of the prisms 31 to 33 or a fall of each surface are adjusted by jigs, and the prisms 31 to 33 are positioned and bonded by the adhesive on the seating surface of the connection prism base 34.

Such a configuration prevents a protrusion of an attachment structure from the external forms of the prisms 31 to 33 and a loss of the area of the seating surface used to bond the prisms 31 to 33. In other words, the prism unit can be made small in its external shape and fastened to the prism base 37 at positions close to three seating surfaces. Further, the prisms 31 to 33 can be sustained by the small number of screws.

If the fixing part of the prism unit is provided on the outer circumferences of the prisms 31 to 33, a moment is likely to occur when an external force is applied to the prisms 31 to 33 and the number of the screw mounting position needs to be increased for ensuring the strength. This will require larger spaces around the prisms 31 to 33.

The connection prism base 34 is a member which determines the above relative relationship among the prisms 31 to 33 as mentioned above, and needs to be rigid which can prevents deformation due to their own weights or an external force applied to them. Particularly, the prism unit is implemented as a product which is expected to be hung from a ceiling or to take an image from a ceiling or a floor, and needs to prepare the stress in all directions.

Accordingly, a material having a high elastic modulus (a longitudinal module equal to or greater than 5 Gpa) such as a glass, a metal, a ceramic, and a hard engineering plastic can be used for a material of the connection prism base 34. Further the material can have as small coefficient of linear expansion as possible (a coefficient of linear expansion equal to or less than $3.0 \times 10-5$ mm/° C.) so that the relative positional relationship cannot change due to the linear expansion due to the temperature.

Unlike an ordinary flat plate, a good moldability of the material is important in forming the intricately shaped connection prism base 34 which has an opening. For example, the prism base can be produced by zinc die-casting, aluminum die-casting, or the like. Specifically, a zinc die-casting can highly precisely form the prism base, and omit a secondary mechanical processing for ensuring the dimensional accuracy, reducing the mass production cost.

Figure 28:
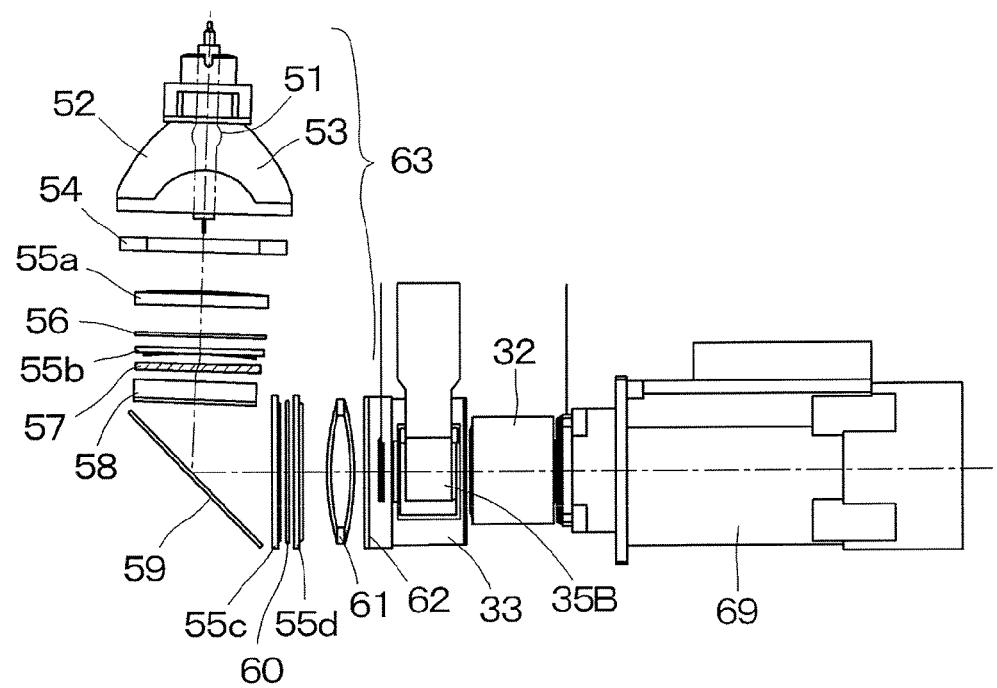
FIG. 28 is an optical plan view of a projection image display apparatus which incorporates a prism unit.
Figure 29:
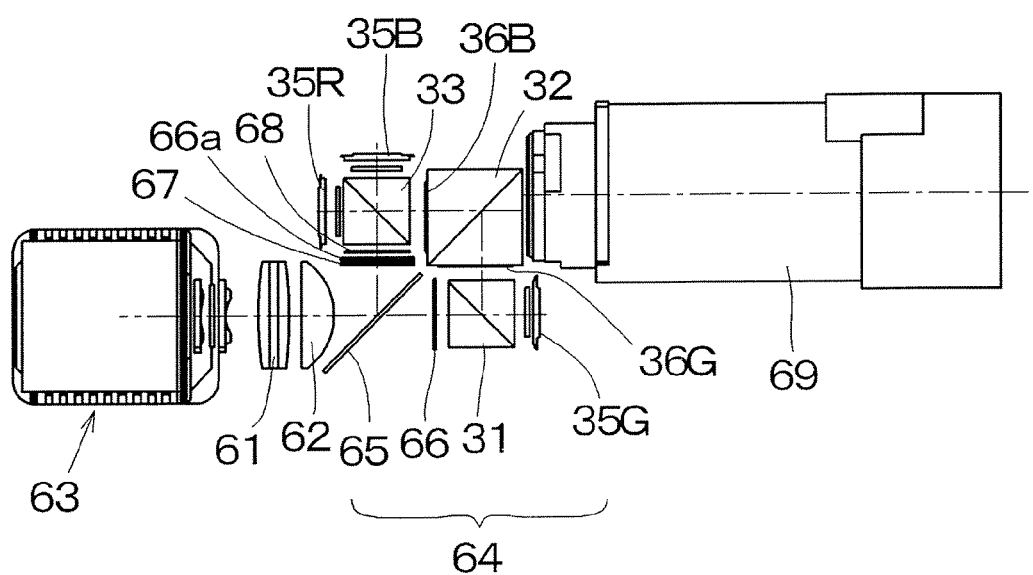
FIG. 29 is an optical sectional view of the projection image display apparatus.

FIG. 28 is an optical plan view of the projection image display apparatus which uses the prism unit shown in FIG. 26. FIG. 29 is its side view. Arranged in front of a light source lamp 53 comprised by a light emitting tube 51 and a reflector 52 are an explosion-proof glass 54, a first cylinder array 55*a*, an ultraviolet absorption filter 56, a second cylinder array 55*b*, a polarization conversion element 57, a front compressor 58, and a total reflection mirror 59. A third cylinder array 55*c*, a color filter 60, and a fourth cylinder array 55*d*, a condenser lens 61, a rear compressor 62 are arranged in a reflection direction of the total reflection mirror 59. An illumination optical system 63 includes the above items from the light source lamp 53 to the rear compressor 62.

A luminous flux emitted from the illumination optical system 63 is adapted to enter a color separation/synthesis optical system 64. The color separation/synthesis optical system 64 includes a green light incident side polarization plate 66, the green light path prism 31 and the reflective liquid crystal panel 35G, which are previously described, in a transmission direction of a dichroic mirror 65. A synthesis prism 32 equipped with the green light exiting side polarization plate 36G are also arranged in the reflecting direction of the green light path prism 31. Further, a trimming filter 67, an incident side polarization plate 66*a*, a color selection phase difference plate 68, a red-blue color light path prism 33, and a reflective liquid crystal panel 35B are arranged in a reflection direction of the dichotic mirror 65.

The reflective liquid crystal panel 35R is arranged in a reflection direction of the luminous flux from the dichroic mirror 65 in the red blue light path prism 33. Further, the composition prism 32 equipped with the blue light exiting side polarization plate 36B is arranged on the side on the exit side of the prism 33. The light exiting form the synthesis prism 32 reaches a projection lens barrel 69.

Figure 30:
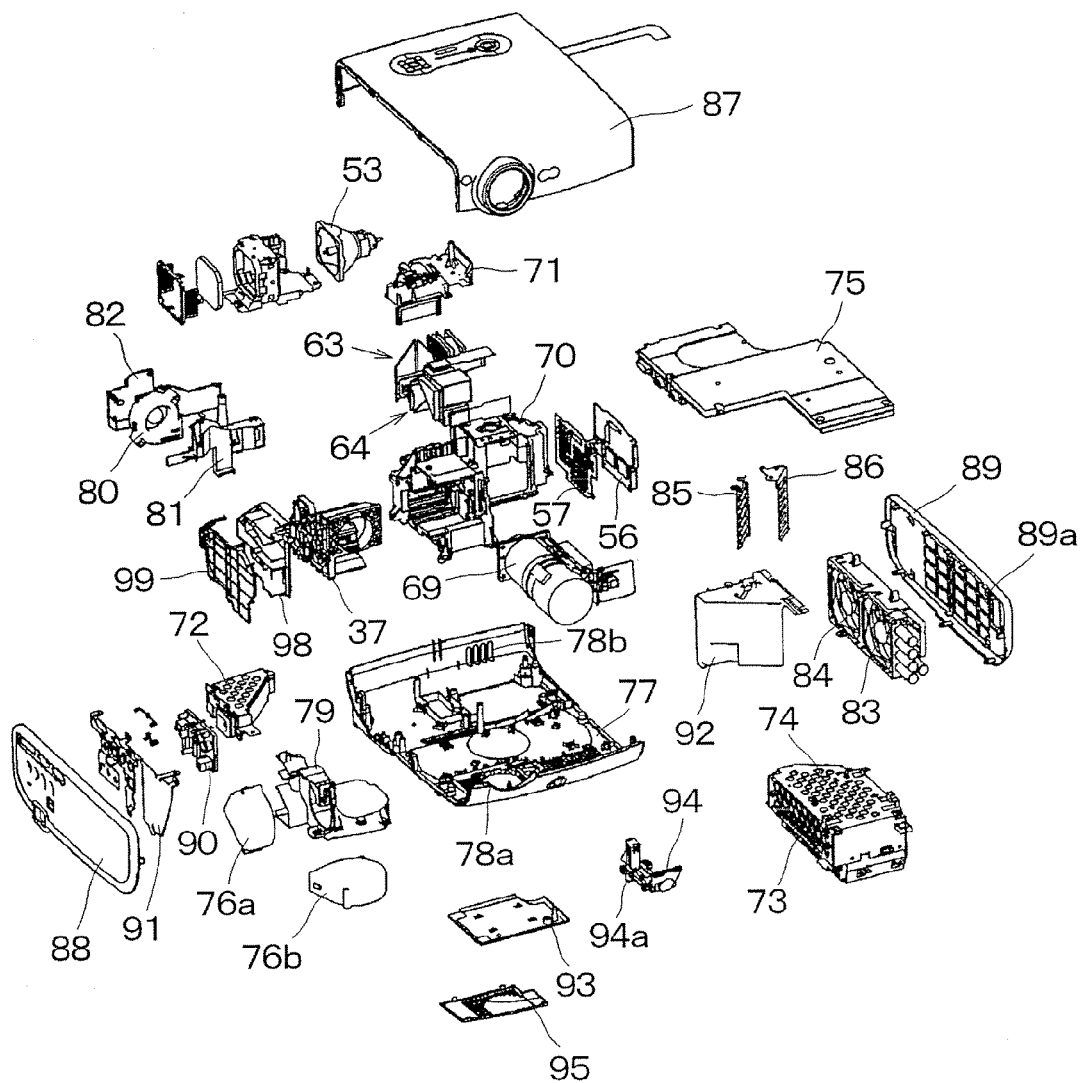
FIG. 30 is a perspective view of the projection image display apparatus.

FIG. 30 is an exploded perspective view of a projection image display apparatus. An illumination optical system 63 receives the light form the light source lamp 53, and the color separation optical system 64 includes liquid crystal panels 35G, 35R, and 35B respectively for three colors of light of red R, green G, and blue B, which receive the exit light from the illumination optical system 63. The projection lens barrel 69 receives the exit light from the color separation optical system, projects an image onto a screen (not shown), and includes a projection lens in its inside.

An optical box 70 accommodates the light source lamp 53, the illumination optical system 63, and the color separation/synthesis optical system 64, and fixes the projection lens barrel 69. A lid 71 is put on the optical box 70 that accommodates the illumination optical system 63 and the color separation/synthesis optical system 64. A light source filter 72 and a ballast light source 73 are united with a light source 74, and supply the current to the light source lamp 53 to turn it on. The circuit substrate 35 sends a command of driving the liquid crystal panels and a command of turning on the light source lamp 53 by a power supplied from the power supply 74. Optical cooling fans 76*a* and 76*b* cool optical elements such as the liquid crystal panels in the color separation/synthesis system 64 by absorbing the air from an air hole 78*a* on an enclosure barrel 77. A duct 79 delivers the winds by the optical cooling fans 76*a* and 76*b* to the liquid crystal panels in the color separation/synthesis optical system 64.

A lamp cooling fan 80 delivers the wind to and cools the light source lamp 53, and a lamp duct 81 delivers the cooling wind to the lamp while holding the lamp cooling fan 80. A lamp duct 82 compresses the lamp cooling fan 80, and constructs the ducts together with the lamp duct 81. A light source cooling fan 83 makes winds circulate in the light source 74 and the ballast light source 73, and concurrently cools the light source 74 and the ballast light source 73 by absorbing the air from the air hole 78*b* provided in an enclosure barrel 77. An exhaust fan 84 exhausts from the enclosure barrel 77 a hot air which has passed through the light source lamp 53 by the lamp cooling fan 80.

The lamp exhausting louvers 85 and 86 serve as shields which prevent the light from the light source lamp 53 from leaking outside the device. The enclosure barrel 77 accommodates the optical box 79, and the enclosure barrel cover 87 is put on the enclosure barrel 77 that accommodates the optical box 70. The enclosure barrel 77 is closed by side plates 88 and 89, and an exhaust port 89*a* perforates the side plate 89. A connector which retrieves various types of signals is arranged on the interface substrate 90, and a interface reinforcing plate 91 is incorporated in the side plate 48.

The lamp exhausting box 92 delivers the exhausted heat from the light source lamp 53 to the exhausting fan 84. The lamp exhausting box 92 is configured to prevent the exhausted wind from being released to the external barrel 77, and retains the lamp exhausting louvers 85 and 86. The detachable lamp cover 93 is disposed on the bottom of the enclosure barrel 77, and fixed by screws. The set adjustment leg 94 is fixed on the enclosure barrel 77, and the height of the leg 94*a* and the inclination angle of the device are adjustable.

A RGB plate 95 has a filter (not shown) outside the air hole 78*a* on the enclosure barrel 77. A RGB substrate 96 is arranged in the color separation/synthesis optical system 64, and connected to a FPC from the reflection type liquid crystal display element and the circuit substrate 35. The RGB substrate cover 97 is configured to prevent electrical noises from entering into the RGB substrate 96.

The prism base 37 holds the color separation/synthesis optical system 64, and the box side cover 98 has a duct forming part that guides a cooling wind from optical cooling fans 76a and 76b in order to cool the optical element and the reflection type liquid crystal display element of the color separation/synthesis optical system 64. The RGB duct 99 forms a duct together with the box side cover 98.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-312008, filed on Dec. 3, 2007, which is hereby incorporated by reference herein in its entirety.

What is claimed is:

1. A prism unit comprising:
a prism having at least one optical surface in its inside;
a prism base disposed at an end surface of the prism and orthogonal to the optical surface thereof, the prism base including at least three seating surfaces that are arranged to face the end surface of the prism; and
one or more bonding surfaces bonded to the end surface of the prism by an adhesive,
wherein the prism slides on interfaces with the seating surfaces when stretching or shrinking due to temperature changes,
wherein the at least three seating surfaces are arranged facing the end surface of the prism symmetrically relative to the plane of the optical surface of the prism, and
wherein the one or more bonding surfaces are arranged on the end surface of the prism symmetrically relative to the plane of the optical surface of the prism.

2. A prism unit according to claim 1, wherein, of the at least three seating surfaces, one seating surface is intersected by the plane of the optical surface of the prism.

3. A prism unit according to claim 1, wherein, of the one or more bonding surfaces, at least one bonding surface is intersected by the plane of the optical surface of the prism.

4. A prism unit according to claim 1, wherein the seating surface and the one or more bonding surfaces have circular shapes.

5. A prism unit according to claim 1, wherein the seating surface and the one or more bonding surfaces have polygonal shapes.

6. A prism unit according to claim 1, wherein a plurality of the prisms are attached to the prism base.

7. A prism unit according to claim 1, wherein the prism is a beam splitter prism that includes a dielectric multilayer held by a plurality of prism members.

8. A projection image display apparatus comprising a prism unit according to claim 1.

* * * * *